United States Patent
Guihot

(10) Patent No.: US 9,454,251 B1
(45) Date of Patent: Sep. 27, 2016

(54) METHODS, SYSTEMS, AND MEDIA FOR CONTROLLING A REMOTE DEVICE USING A TOUCH SCREEN OF A MOBILE DEVICE IN A DISPLAY INHIBITED STATE

(71) Applicant: Google Inc., Mountain View, CA (US)

(72) Inventor: Herve Guihot, Mountain View, CA (US)

(73) Assignee: Google Inc., Mountain View, CA (US)

( * ) Notice: Subject to any disclaimer, the term of this patent is extended or adjusted under 35 U.S.C. 154(b) by 320 days.

(21) Appl. No.: 13/928,174

(22) Filed: Jun. 26, 2013

(51) Int. Cl.
*G06F 3/041* (2006.01)
*G08C 19/16* (2006.01)
*G08C 17/00* (2006.01)

(52) U.S. Cl.
CPC ............. *G06F 3/0412* (2013.01); *G08C 17/00* (2013.01)

(58) Field of Classification Search
CPC .................. H04N 21/4222; H04N 21/42219; H04N 21/42224; H04N 5/4403; G08C 2201/93; G08C 17/00; G06F 3/0412
USPC ................................................. 345/156–178
See application file for complete search history.

(56) References Cited

U.S. PATENT DOCUMENTS

| 2010/0079380 | A1 | 4/2010 | Nurmi | |
| 2011/0260829 | A1* | 10/2011 | Lee | G06F 3/0414 340/5.51 |
| 2012/0212435 | A1* | 8/2012 | Bae | 345/173 |
| 2013/0082974 | A1 | 4/2013 | Kerr | |
| 2013/0194172 | A1* | 8/2013 | Shyamalan | 345/156 |
| 2014/0055251 | A1* | 2/2014 | Son et al. | 340/12.54 |
| 2014/0085221 | A1* | 3/2014 | Kim | G06F 3/016 345/173 |

FOREIGN PATENT DOCUMENTS

WO     WO 2009076974     6/2009

OTHER PUBLICATIONS

International Search Report dated Oct. 7, 2014 in International Patent Application No. PCT/US2014/044331.
Written Opinion dated Oct. 7, 2014 in International Patent Application No. PCT/US2014/044331.

* cited by examiner

*Primary Examiner* — Amit Chatly
(74) *Attorney, Agent, or Firm* — Byrne Poh LLP

(57) ABSTRACT

Methods, systems, and media for controlling a remote device using a touchscreen of a mobile device in a display inhibited state are provided. In some implementations, a method for controlling media playback devices is provided, the method comprising: detecting a media playback device to be controlled; determining that a touch-sensitive display of a mobile device has entered a display inhibited state in which presentation of a plurality of user interface elements is inhibited; receiving an input from the touch-sensitive display in the display inhibited state; selecting an action of the media playback device to be performed by determining that the received input corresponds to a user interface element from the plurality of user interface elements; and transmitting an instruction to perform the selected action to the media playback device.

30 Claims, 11 Drawing Sheets

METHODS, SYSTEMS, AND MEDIA FOR CONTROLLING A REMOTE DEVICE USING A TOUCH SCREEN OF A MOBILE DEVICE IN A DISPLAY INHIBITED STATE

TECHNICAL FIELD

The disclosed subject matter relates to methods, systems, and media for controlling a remote device using a touchscreen of a mobile device in a display inhibited state.

BACKGROUND

Mobile devices, such as smartphones and tablet devices, can be used to control presentation of media content on a television. For example, a mobile device can launch a dedicated remote control application that presents a control interface to the user of the mobile device and, in response to a user selection on the control interface, transmits instructions to the television. However, the screen of the mobile device is often turned off after a certain period of inactivity. Alternatively, the brightness of the screen of the mobile device is dimmed or otherwise enters a power conserving state. In order to continue controlling the television with the control interface of the dedicated remote control application, the user is required to wake up the mobile device by selecting a button on the mobile device, interacting with the screen of the mobile device, etc. This can also include requiring the user to unlock the mobile device (e.g., by entering a password, passcode, drawing a particular pattern on the touchscreen, etc.) and/or navigate to or even restart the dedicated remote control application. These can detract from the user's experience in using the mobile device and/or the remote control application.

Accordingly, it is desirable to provide methods, systems, and media for controlling a remote device using a touchscreen of a mobile device in a display inhibited state.

SUMMARY

In accordance with various implementations of the disclosed subject matter, methods, systems, and media for controlling a remote device using a touchscreen of a mobile device in a display inhibited state.

In accordance with some implementations of the disclosed subject matter, a method for controlling media playback devices is provided, the method comprising: detecting a media playback device to be controlled; determining that a touch-sensitive display of a mobile device has entered a display inhibited state in which presentation of a plurality of user interface elements is inhibited; receiving an input from the touch-sensitive display in the display inhibited state; selecting an action of the media playback device to be performed by determining that the received input corresponds to a user interface element from the plurality of user interface elements; and transmitting an instruction to perform the selected action to the media playback device.

In accordance with some implementations of the disclosed subject matter, a system for controlling media playback devices is provided, the system comprising: a touch-sensitive display; and a hardware processor that is configured to: detect a media playback device to be controlled; determine that a touch-sensitive display of a mobile device has entered a display inhibited state in which presentation of a plurality of user interface elements is inhibited; receive an input from the touch-sensitive display in the display inhibited state; select an action of the media playback device to be performed by determining that the received input corresponds to a user interface element from the plurality of user interface elements; and transmit an instruction to perform the selected action to the media playback device.

In accordance with some implementations of the disclosed subject matter, a non-transitory computer-readable medium containing computer executable instructions that, when executed by a processor, cause the processor to perform a method for controlling media playback devices is provided, the method comprising: detecting a media playback device to be controlled; determining that a touch-sensitive display of a mobile device has entered a display inhibited state in which presentation of a plurality of user interface elements is inhibited; receiving an input from the touch-sensitive display in the display inhibited state; selecting an action of the media playback device to be performed by determining that the received input corresponds to a user interface element from the plurality of user interface elements; and transmitting an instruction to perform the selected action to the media playback device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
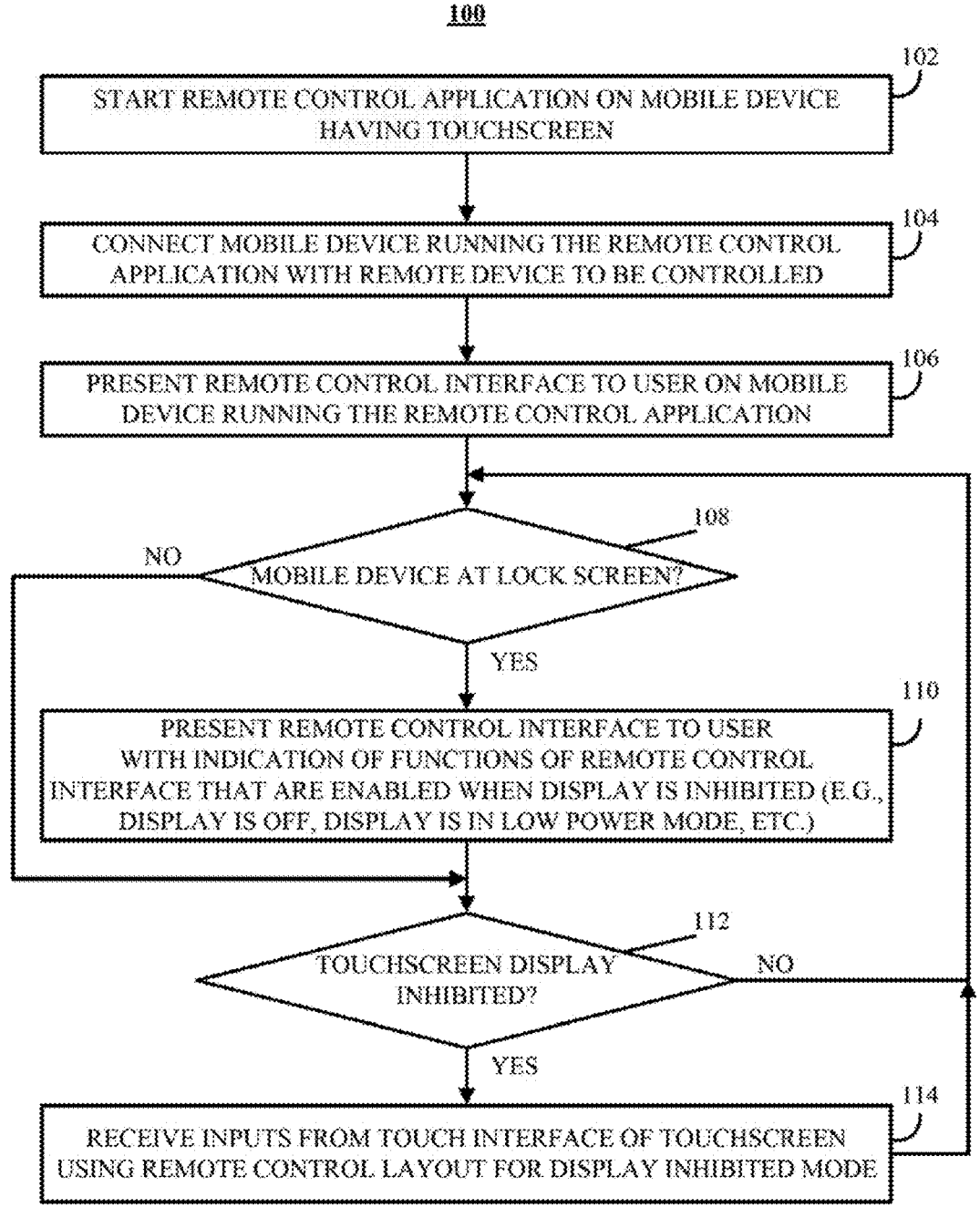
FIG. 1 shows an illustrative example of a process for controlling a remote device using a touchscreen of a mobile device in a display inhibited state in accordance with some implementations of the disclosed subject matter.

In accordance with various implementations, mechanisms for controlling a remote device using a touchscreen of a mobile device in a display inhibited state are provided.

Generally speaking, these mechanisms can provide a remote control application for accepting input from a touchscreen of a mobile device and generating instructions for controlling a remote device based on the received input. These mechanisms can be used to control any suitable remote devices such as, for example, a television, a smart television, a game console, a set-top box, a digital media receiver, a personal computer, a laptop computer, a tablet computer, etc.

In some implementations, the remote control application can be launched when a remote device is to be controlled using the mobile device running the remote control application. As described below, for example, in connection with FIG. 1, the remote control application can be launched at any suitable time, using any suitable technique(s). For example, the remote control application can be launched in response to receiving a user input on a touchscreen to launch the remote control application.

In some implementations, after launching the remote control application, the remote control application can provide the user with an opportunity to select a remote device to control. The remote device selected to be controlled can be selected by a user or can be selected automatically. Additionally, the mobile device running the remote control application can be paired with the remote device to be controlled using two-way communication between the remote device and the mobile device (e.g., over a wired and/or wireless network), or can be paired with the remote device to be controlled by selecting a remote device to be controlled and sending instructions to the remote device using one-way communication (e.g., using infrared signals).

In some implementations, the remote control application can present a remote control interface on the touchscreen of the mobile device. For example, if the mobile device is running the remote control application as a foreground application which is being presented using the display of the touchscreen, the remote control application can present a remote control interface to a user comprising various user interface elements for generating instructions to control the remote device. As described below, the user interface elements can correspond to various functions of a remote device, such as playing or pausing of media content being presented, or any other suitable functions. Additionally, inputs received by a touch interface of the touchscreen that correspond to one or more of the user interface elements (e.g., a touch of a play/pause button) can cause the remote control application to send an instruction to the remote device to perform an action that corresponds to the user interface element (e.g., play or pause media content being presented by the remote device).

In some implementations, if the mobile device running the remote control application displays a lock screen or otherwise inhibits access to certain applications, a remote control interface can be presented to the user at the lock screen, and the touch interface of the remote control can accept inputs that correspond to the remote control interface. Additionally or alternatively, a remote control interface can be presented to the user at the lock screen in lieu of any or all user interface items normally presented by the mobile device to a user at the lock screen.

In some implementations, if the mobile device running the remote control application is in a display inhibited state (e.g., a state where the display is turned off, where the display is operated without a backlight, where a refresh rate of the display is a lower frequency, etc.), a remote control interface can be provided and/or presented using the touchscreen of the mobile device. Such a remote control interface can cause a touch interface of the touchscreen to accept inputs regardless of whether a remote control interface is presented on the display of the touchscreen. This can allow a user to provide inputs to the remote control interface of the remote control application for controlling the remote device, even if the mobile device is operating in a low power state, or other state where display is inhibited with reference to a normal operating state of the mobile device. In some implementations, the remote control interface provided in the display inhibited state can be a limited remote control interface having fewer functions than a remote control interface provided when the remote control interface is presented to the user using the display of the touchscreen.

In some implementations, user interface elements that correspond to functions of the remote device that can be controlled when the mobile device is in a display inhibited state can be distinguished when presented to the user from user interface elements that correspond to functions of the remote device that cannot be controlled in the display inhibited state. Any suitable technique(s) can be used to distinguish user interface elements that can be used in the display inhibited state from user interface elements that cannot be used in display inhibited state. For example, upon launching the remote control application, user interface elements that can be used in the display inhibited state can be highlighted to a user. In a more particular example, an explanation (e.g., a tutorial) of which user interface elements can be used in the display inhibited state can be presented to the user. As another example, user interface elements that cannot be used in the display inhibited state can be greyed out.

Turning to FIG. 1, an example 100 of a process for controlling a remote device using a touchscreen of a mobile device in a display inhibited state is provided in accordance with some implementations of the disclosed subject matter. At 102, a remote control application can be launched on a mobile device having a touchscreen (e.g., a smartphone, a tablet computer, a PDA, etc.). The remote control application can be launched using any suitable technique(s). For example, in some implementations, a user can select an icon corresponding to the remote control application to launch the remote control application. As another example, the remote control application can launch in response to detecting the presence of a paired remote device (e.g., a remote device that has previously been paired with the mobile device in accordance with 104 as described below). As yet another example, the remote control application can launch in response to an action performed by another application running on the mobile device. More particularly, the remote control application can launch in response to a media playback application on the mobile device sharing content with a remote device to, for example, play media content on the remote device. As still another example, the remote control application can be incorporated into another application (or other applications) of the mobile device, such that the remote control application launches in response to launching that application or performing a specified action within that application. In a more particular example, the remote control application can be incorporated into an application that connects the mobile device to a television (or other media presentation device) for controlling presentation of media content on the television.

At 104, the remote control application can cause the mobile device to pair with one or more remote devices to be controlled. The remote control application can be configured to control any suitable remote device, such as a smart television, a digital media receiver, a gaming console, a set-top box, a television, an audio-video receiver, a media center personal computer, a personal computer, a laptop computer, and/or any other suitable remote device.

In some implementations, the mobile device running the remote control application and the remote device to be controlled can communicate with each other over a network to establish two-way communication. For example, if both the mobile device and the remote device are connected to the same local area network (e.g., a wired local area network, a wireless local area network, a combination of such networks), the mobile device and the remote device can communicate over the local area network. As another example, if both the mobile device and the remote device are connected to the same non-local network (e.g., the Internet), the mobile device and the remote device can communicate over the non-local network to establish communication. In such an example, the user can be presented with a code by the mobile device and/or the remote device to input into a user interface. This can be used to identify the device that the user is attempting to establish communication with over the non-local network. As yet another example, the mobile device can set up a wireless ad hoc network to directly connect to a remote device that is discovered to be in the same area as the mobile device, using for example, one of the IEEE 802.11 family of wireless communication standards. As still another example, the mobile device can directly communicate with a remote device using a short range radio communication standard such as BLUETOOTH or WIRELESS USB. As a further example, communication can be established between the mobile device running the remote control application and a remote device running a corresponding application, a particular operating system, or any other compatible software.

In some implementations, when two-way communication has been established between the mobile device and a remote device to be controlled, these two devices can be referred to as being paired, which is also sometimes referred to herein as two-way pairing. In some implementations, when the mobile device running the remote control application and a remote device to be controlled are paired, identification information for the remote device can be stored in memory of the mobile device to allow pairing with the remote device in the future. This can allow the mobile device running the remote control application to automatically connect to the remote device to be controlled in future instances.

In some implementations, the mobile device running the remote control application can be configured to transmit instructions to a remote device to be controlled, where the remote device to be controlled is not configured to communicate with the mobile device. When the mobile device is configured to control a device that accepts control signals but can not communicate with the mobile device, this is sometimes referred to herein as one-way pairing with the remote device. For example, the remote device can be a television configured with an infrared receiver that accepts infrared signals that include remote control commands, and the mobile device can be configured with an infrared transmitter for transmitting infrared signals that include remote control commands.

In some implementations, a device to be controlled (e.g., a device to establish one-way pairing with) can be selected using any suitable technique(s) and the remote control interface can be programmed with a code library for controlling the device using any suitable technique(s). For example, in some implementations, a device to be controlled can be selected: by selecting a remote device from a list of devices; by selecting a type of device (e.g., a television, a set-top box, etc.) to be controlled can be chosen from a list of types of devices; by outputting control signals for various devices consecutively (e.g., a power control, a channel control, etc.), receiving an indication from a user when the remote device responds to such a control, and setting a control scheme in response to the user indication; any other suitable technique; or a combination of such techniques. In a more particular example, a device to be controlled can be selected from a list of devices, and a code library corresponding to commands for controlling the device can be retrieved and/or loaded from any suitable source (e.g., memory, a remote server that stores code libraries according to device, etc.).

In some implementations, a connection to a device to be controlled by one-way pairing can be established using any suitable hardware, such a transmitter (e.g., an infrared transmitter) coupled to the mobile device, a transmitter integrated into the mobile device, a second remote device capable of two-way communication with the mobile device (e.g., two-way pairing) having a transmitter for transmitting signals to a remote device incapable of two-way pairing with the mobile device, or any other suitable hardware.

In some implementations, pairing at 104 can include a user interface for discovering and/or pairing devices. For example, as described above, a list of devices can be presented to a user for selection of a device to be controlled. As another example, such a user interface can include a control for automatically determining devices to be controlled. In some implementations, pairing can be performed automatically using any suitable techniques. For example, pairing can be performed by detecting a remote device configured to communicate with the mobile device on a local area network to which the mobile device is connected. As another example, the mobile device can discover remote devices on a network (e.g., a local area network, an ad hoc network, a short distance wireless communication network, etc.) by broadcasting a request that such remote devices identify themselves, and receiving responses prior to establishing two-way communication. As yet another example, pairing can be performed over a local network (e.g., a LAN, an ad hoc network, etc.) or non-local network (e.g., the Internet, a wide area network, etc.) accessible by both the mobile device and the remote device to be controlled by entering an address of the remote device (e.g., an IP address) using the mobile device (or vice versa) and initiating a communication session. As still another example, pairing can be performed over a local network (e.g., a LAN, an ad hoc network, etc.) or non-local network (e.g., the Internet, a wide area network, etc.) accessible by both the mobile device and the remote device to be controlled by causing the remote device or the mobile device to generate a code which can be entered on the other device while both devices are in a pairing mode, in order to pair the devices over the network. As a further example, pairing can be performed if a user is logged in to the same user account (or linked user accounts) in related applications (e.g., an operating system, a media playback application, a browser application, etc.) running on each of the devices.

In some implementations, pairing can be performed at any suitable time, such as when the remote control application is launched, or when selection of an option for configuring devices to be controlled is received. Additionally, pairing can be carried out in response to an action performed in another application such as when a user selects to share a video being presented on the mobile device (e.g., a tablet computer) with a remote device (e.g., a television, a digital media receiver, a set-top box, a personal computer, etc.).

In some implementations, pairing can be carried out automatically based on devices that have previously been paired, and/or can be carried out in response to a particular action. For example: if the mobile device determines that a previously paired remote device is close to the mobile device (e.g., based on signal strength, a location of the mobile device and a known location of the paired remote device); if the mobile device determines that the remote device is on the same local area network as the mobile device; in response to a user launching the remote control application on the mobile device; in response to the user sharing media with a paired device; or at any other suitable timing. In some implementations, pairing between the mobile device and a remote device to be controlled can be carried out from a lock screen of the mobile device, for example, as described below in connection with FIGS. 4A and 4B.

At 106, a remote control interface can be presented to the user on the display of the mobile device running the remote control application. The remote control interface can include any suitable user interface elements (e.g., buttons, sliders, scrubbers, etc.), and can be configured to control any suitable functions of the remote device to be controlled. For example, the remote control interface can include default user interface elements based on the type of media to be presented. For example, the remote control interface can include user interface elements for controlling the remote device to play, pause, control volume, rewind, fast forward, etc., for pre-recorded media such as a movie being presented from local storage or streamed from a remote content source. As another example, the remote control interface can include user interface elements for controlling the remote device to present an electronic programming guide, navigate an electronic programming guide, change a channel, control volume, etc., for content delivered in a traditional cable television system. Additionally, the remote control interface can include default controls based on a type of remote device to be controlled, for example, by not including a volume or channel control if the remote device to be controlled is not configured to change a volume or be tuned to channels. As another example, a pause function can be omitted from the remote control interface if the remote device is not configured for pausing content being presented.

In some implementations, user interface elements and/or functions to be presented as part of the remote control interface and/or placement of user interface elements within the remote control interface can be set using any suitable techniques. For example, by a user setting controls from a settings screen of the remote control interface, or the like. As a more particular example, the remote control interface can allow a user to choose from a set of predefined layouts. As another more particular example, setup of the remote control interface can be set based on a size of a display of the mobile device (e.g., a remote control interface can include less user interface elements, or smaller elements if the screen is smaller, and vice versa).

Figure 2A:
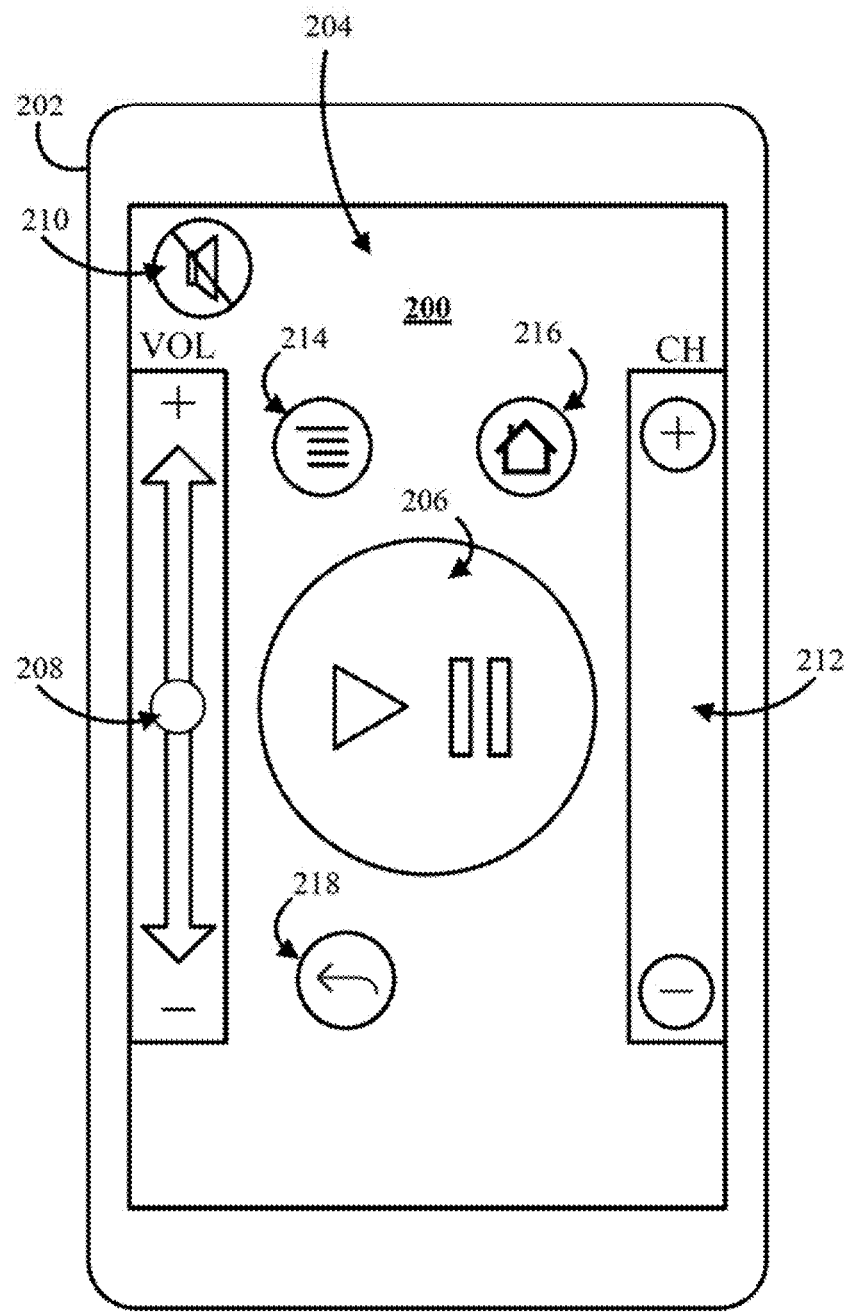
FIGS. 2A-2C show illustrative examples of user interfaces for controlling a remote device using a touchscreen of a mobile device in a display inhibited state in accordance with some implementations of the disclosed subject matter.

FIG. 2A shows an example 200 of a user interface of a remote control application in accordance with some implementations of the disclosed subject matter. In the example shown in FIG. 2A, the remote control application is running on a mobile device 202 having a touchscreen 204 on which the remote control interface can be presented to a user. Such a touchscreen 204 can also be used to detect touch inputs (e.g., from a user) for selecting various user interface elements of the remote control application.

Remote control interface 200 shown in the example of FIG. 2A can include various user interface elements for controlling operation of a remote device. For example, remote control interface 200 can include a play/pause button 206, a volume control 208, a mute button 210, a channel control 212, a guide button 214, a home button 216, and a back button 218. It is understood that the user interface elements shown as being included in remote control interface 200 are merely examples and any suitable user interface elements for controlling any suitable functions of a remote device can be included in a remote control interface using the mechanisms described herein.

In some implementations, play/pause button 206 can be used to control a play/pause state of content being presented by a paired remote device. For example, when a touch is detected on a portion of touchscreen 204 by mobile device 202 at a location that corresponds to play/pause button 206, a command can be sent to the paired remote device to play or pause content being presented by the remote device depending on a current play/pause state of the remote device. In some implementations, if two-way communication is established between mobile device 202, and a remote device to be controlled reports to mobile device 202 that it is currently in a play state, selecting play/pause button 206 can cause a pause command to be issued, and vice versa. Additionally, an icon presented in connection with play/pause button 206 can change depending on a state of the remote device, for example, by presenting a pause icon when the remote device is in a play state and a play icon when the remote device is in a pause state.

In some implementations, volume control 208 can be used to control a volume level of a remote device to be controlled. In some implementations, volume control 208 can include a slider control which can be adjusted to a particular position by touching a portion of touchscreen 208 that corresponds to a current slider position and moving the current slider position along a bar that represents a range of selectable values for volume output by the device to be controlled. As another example, volume control 208 can include a swipe control that can be used to adjust a volume when mobile device 202 detects a swipe gesture within a portion of touchscreen 204 that corresponds to volume control 208, with an upward swipe (e.g., from "−" toward "+") corresponding to volume up, and a downward swipe corresponding to volume down. As yet another example, volume control 208 can include buttons corresponding to locations of "+" and "−" within volume control 208 such that when a touch is detected on a portion of touchscreen 204 by mobile device 202 at a location that corresponds to such buttons, a command for controlling volume can be transmitted to the remote device. Any other suitable controls for controlling volume can be included in volume control 208.

In some implementations, mute button 210 can be used to mute/unmute a volume output of a remote device to be controlled. For example, when a touch is detected on a portion of touchscreen 204 by mobile device 202 at a location that corresponds to mute button 210, a command can be sent to the paired remote device to inhibit audio from being presented by the remote device, or cause audio to be presented if audio presentation is currently inhibited (e.g., in response to a mute command being previously received). In some implementations, if two-way communication is established between mobile device 202 and a remote device to be controlled reports to mobile device 202 that it is currently in an unmuted state, selecting mute button 206 can cause a mute command to be issued, and vice versa. Additionally, an icon presented in connection with mute button 210 can change depending on a state of the remote device, for example by presenting mute button 210 as a red button when the remote device is in a muted state and presenting mute button 210 as a green button when the remote device is not in a muted state.

In some implementations, channel control 212 can be used to control a channel of a remote device to be controlled. Channel control 212 can receive any suitable inputs for controlling a channel, such as inputs similar to those described in connection with volume control 208.

In some implementations, guide button 214 can be used to control the presentation of information related to content currently being presented and/or to cause an electronic program guide or the like to be presented in response to detecting a touch on a portion of touchscreen 204 by mobile device 202 at a location that corresponds to guide button 214.

In some implementations, home button 216 can be used to control presentation of a menu of a remote device to be controlled, to cause the remote device to navigate to a home screen of the remote device, or to cause the remote device to perform any other suitable function. A command corresponding to such functions can be transmitted by mobile device 202 in response to detecting a touch on a portion of touchscreen 204 by mobile device 202 at a location that corresponds to home button 216.

In some implementations, back button 218 can be used to control presentation of a user interface, such as to navigate to a previously presented level of a user interface, to exit a user interface, etc. Additionally or alternatively, back button 218 can be used to control a channel of a remote device to navigate to a channel presented immediately preceding a currently presented channel. A command corresponding to such functions can be transmitted by mobile device 202 in response to detecting a touch on a portion of touchscreen 204 by mobile device 202 at a location that corresponds to back button 218.

In some implementations, in response to a state of the remote device to be controlled (e.g., a presentation state of the remote device to be controlled), remote control interface 200 can be changed to present other user interface elements for controlling the remote device. For example, if the remote device is presenting a video and a presentation of the remote device is in a paused state, remote control interface 200 can change to include seek buttons for searching through the video, scene selection buttons (e.g., next scene, previous scene, etc.), a scrubber bar for showing a progress of the video and/or selecting a particular location in the video to navigate to, or any other suitable controls. As another example, if a guide is presented in response to selection of guide button 214, an electronic program guide can be presented by mobile device 202, or a select button and directional buttons for navigating a guide presented by the remote device to be controlled can be presented.

In some implementations, other suitable signals generated by mobile device 202 can be used to control a remote device to be controlled. For example, a swipe gesture from left to right on touchscreen 204 can cause a fast-forward command to be issued to the remote device and a swipe from right to left on touchscreen 204 can cause a rewind command to be issued to the remote device. In some implementations, such a feature may only be available when the presentation of content by the remote device to be controlled is paused. As another example, in response to detecting a press and hold gesture on touchscreen 204 of mobile device 202, mobile device 202 can cause a user interface to be presented by the remote device to be controlled, and cause remote control interface 200 to be changed to control the user interface presented by the remote device. As still another example, any suitable gestures and/or multi-touch inputs detected by touchscreen 204 can be used to generate any suitable commands to be transmitted to the remote device.

In some implementations, motion sensors of mobile device 202, such as an accelerometer(s), a gyroscope(s), a magnetometer(s), etc., can generate signals which can be used as the basis for commands to be generated by mobile device 202. For example, if mobile device 202 issues a command to the remote device to be controlled to pause the presentation of content, mobile device 202 can respond to a rotation detected by one or more motion sensors by, for example, fast forwarding or rewinding content being presented by the remote device based on the sensed rotation. In another example, mobile device 202 can present a user interface of the remote control application upon detecting that mobile device 202 is in a particular orientation, and present a user interface of another application (e.g., an operating system of mobile device 202, a web browser application, etc.). As yet another example, if mobile device 202 is in a display inhibited state (e.g., as described below in connection with 114 of FIG. 1), the remote control application can use a first layout with a first set of remote control functions (e.g., play, pause, volume, channel) in a first orientation (e.g., in a portrait orientation), and can use a second layout with a second set of remote control functions (e.g., play, pause, fast forward, skip forward, rewind, skip back, etc.) in a second orientation (e.g., in a landscape orientation).

Referring back to FIG. 1, at 108, the remote control application can determine whether the mobile device is at a lock screen and/or in a locked state. In some implementations, a lock screen of a mobile device can include a user interface that limits functions that can be performed by the mobile device to a limited set of functions. For example, in some implementations, a mobile device in a lock screen can be used to make calls to emergency services (e.g., can be used to call 911). In some implementations, a certain input or combination of inputs are required in order to "unlock" the mobile device (e.g., in order to access other functions of the mobile device). Such inputs can include a button press or combination of button presses, a swipe of an icon, moving the mobile device in a particular motion, a particular series of contacts on a touchscreen of the mobile device (e.g., presses, gestures, etc.), entering a particular password or passcode (using, e.g., numbers, letters, a particular movement, etc.).

Any suitable technique(s) can be used to determine whether the mobile device is at a lock screen or locked state. For example, the remote control application can request a status of the mobile devices periodically to determine whether the mobile device is at a lock screen. As another example, in response to the mobile device entering a lock screen, an operating system of the mobile device can cause a notification to be sent to applications running on the mobile device.

In some implementations, in cases where the mobile device is running the remote control application as a primary application (e.g., a remote control interface, such as remote control interface 200 is being presented to the user), the remote control application can inhibit the mobile device from transitioning from an unlocked state to a low power state, sleep state, or power conservation state directly, without first going to a lock screen. For example, if the mobile device is configured to enter a low power state after a predetermined period of time without detecting user input (e.g., one minute, five minutes, etc.), the remote control application can cause the mobile device to first enter a lock screen before entering the low power state. As another example, if the mobile device is configured to enter a power conservation state (e.g., a state in which one or more features of the mobile device are inhibited or operated at less than full capacity to conserve power of a power source such as an internal battery) after a predetermined period of time or in response to a particular user input, the remote control application can cause the mobile device to enter a lock screen before entering the power conservation state. In some implementations, such an inhibition of state transition from an unlocked state to a low power state (or power conservation state) can be caused whenever the mobile device is paired to a remote device to be controlled, whenever the mobile device is running the remote control application, only when the state transition is caused by a timer and not when the state transition is caused by, e.g., a button press, or at any other suitable time.

If the remote control application determines that the mobile device is at a lock screen ("YES" at 108), process 100 can proceed to 110. Otherwise, if the remote control application determines that the mobile device is not at a lock screen ("NO" at 108), process 100 can proceed to 112, described below.

At 110, the remote control application can present a remote control interface for a lock screen to a user with an indication of which functions of the remote control interface are enabled when a display of a touchscreen is inhibited. In some implementations, a remote control interface presented when the mobile device running the remote control application is at a lock screen can differ from a remote control interface that is presented when the mobile device is unlocked and presenting the remote control interface (e.g., as shown in the example of FIG. 2A). For example, the location, number, size, color, etc., of user interface elements used for controlling a remote device to be controlled can be different in a remote control interface presented on a lock screen than are presented in a remote control interface presented in an unlocked state.

In some implementations, user interface elements that are available in the remote control interface of the lock screen can be distinguished based on whether the functions associated with the user interface elements are available when a display of the mobile device is inhibited. For example, in some implementations, user interface elements that correspond to functions that will not be available when the display is inhibited can be presented in a different color, a different texture, a different brightness, etc. As another example, a user interface overlay can be presented in response to the mobile device going to a lock screen. Such an overlay can present an explanation of which user interface elements correspond to functions that are available when the display of the mobile device is inhibited. In such an example, the overlay can be dismissed by receiving a user input by the touchscreen such as a tap, a user input at a particular location corresponding to an exit icon, etc. As yet another example, a help button can be presented in a lock screen and in response to receiving an input corresponding to the help button, the remote control application can present a user interface that describes which functions are available when the display is inhibited. As still another example, if the mobile device is configured to go from the lock screen to a display inhibited state after a predetermined period of time (e.g., thirty seconds, one minute, etc.), user interface elements that correspond to functions that are not available in the display inhibited state can fade as the predetermined time elapses. As a further example, if an input is received to go to a display inhibited state (e.g., a signal is received from a particular software or physical button), the remote control application can present user interface elements that correspond to functions that are available in the display inhibited state for a short time (e.g., 0.5-2 seconds) prior to going to the display inhibited state.

Figure 2B:
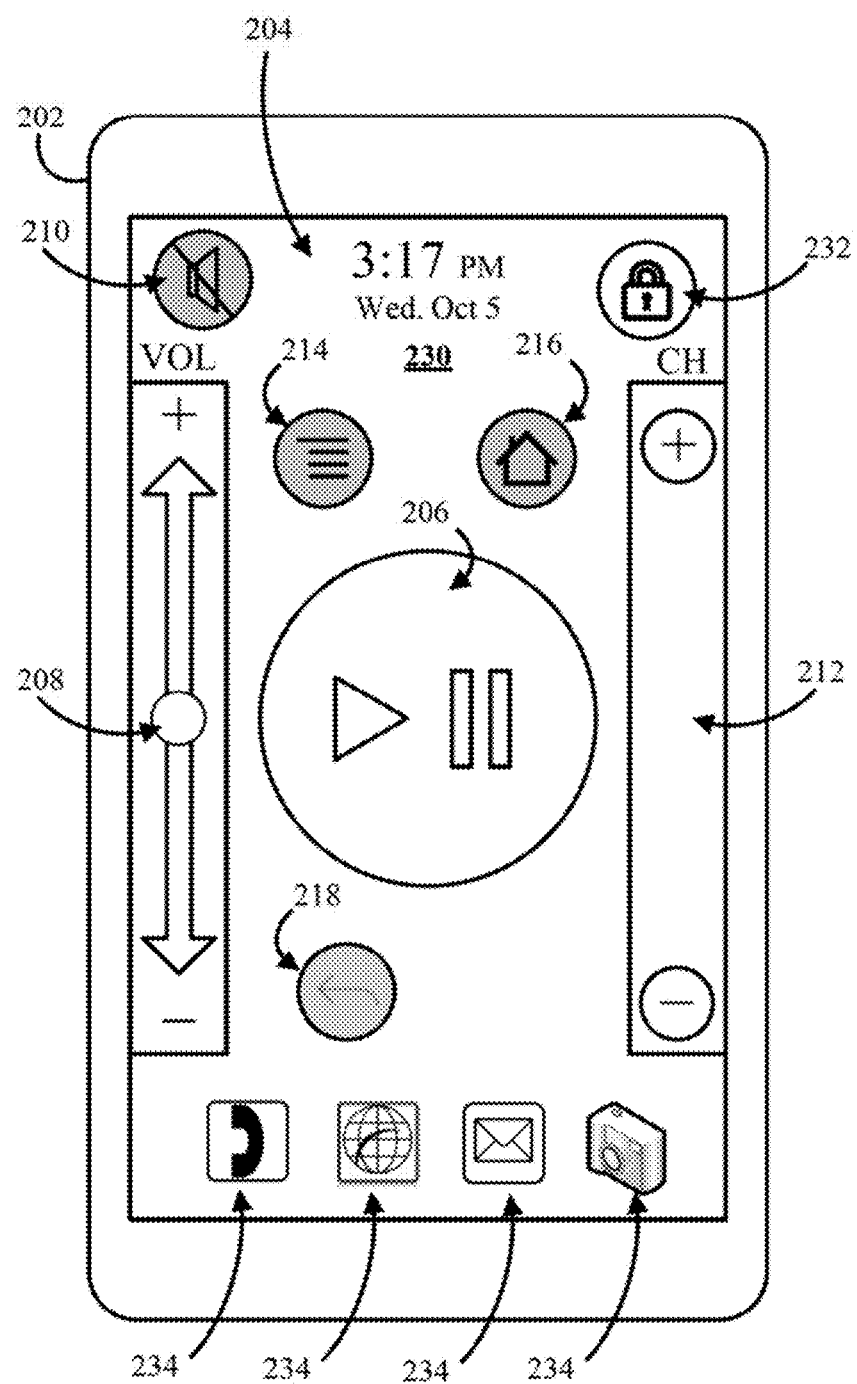

FIG. 2B shows an illustrative example 230 of a user interface of a remote control application in accordance with some implementations of the disclosed subject matter. In the example shown in FIG. 2B, the remote control application is running on mobile device 202 in which a lock screen is presented to a user.

Remote control interface 230 shown in the example of FIG. 2B can include various user interface elements for controlling operation of a remote device, which can include user interface elements 206-218, described above in connection with FIG. 2A. In some implementations, remote control interface 230 can include a lock icon 232 which can indicate to a user that mobile device 202 is at a lock screen. Additionally, selection of lock icon 232 can cause mobile device 202 to initiate an unlock sequence, cause the mobile device to present an overlay explaining which functions are available in a display inhibited state (e.g., as described above), cause the mobile device to go to a display inhibited state, cause the mobile device to inhibit presentation of remote control interface 230 (or present remote control interface 230 if presentation has previously been inhibited), or any other suitable function.

In the example, shown in FIG. 2B, mute button 210, guide button 214, home button 216 and back button 218 are differentiated from play/pause button 206, volume control 208 and channel control 212. In general, the functions can be differentiated by presenting the buttons for features that are available can be displayed using a first format (e.g., color, transparency, brightness, animation, shading, etc.), and by presenting the buttons for features that are not available using a second format. In this example, buttons 210-218 being presented as greyed out can indicate that these features of the remote control interface are not available in a display inhibited state.

In some implementations, a lock screen of a mobile device, such as mobile device 202, can include any other suitable functions and/or information. For example, a current time and date can be presented in the lock screen, icons 234 for accessing functions of mobile device 202 from the lock screen can be presented, etc.

Returning to FIG. 1, at 112, the remote control application can determine whether the mobile device has entered a display inhibited state. The mobile device can enter a display inhibited state in response to any suitable action. For example, the mobile device can enter the display inhibited state in response to a predetermined period of time elapsing without receiving any user input (whether the mobile device is in an unlocked state or at a lock screen). As another example, the mobile device can enter the display inhibited state in response to receiving a signal indicating that a particular button (e.g., a hardware button, a software button, etc.) has been activated. As yet another example, the mobile device can enter the display inhibited state in response to a signal from an application running on the mobile device, such as the remote control application, a media presentation application, etc.

A display inhibited state of a mobile device can include any suitable combination of states of the mobile device. For example, in some implementations, a display inhibited state of the mobile device can include inhibiting a backlight of a display of a touchscreen of the mobile device. As another example, power consumption by the display can be reduced by reducing a driving frequency of the display (e.g., by half, by ninety percent, to zero, etc.), by reducing a voltage supplied to a backlight (e.g., by half, by ninety percent, to zero, etc.), reducing a number of backlight elements used to provide a backlight for the display, etc. As yet another example, if a mobile device has a hybrid display with a backlit display (e.g., an LCD display) and a reflective or front lit display (e.g., an electronic paper display), the back lit display can be inhibited and the reflective or front lit display can be used to present information with a low refresh rate (e.g., 1 Hertz, 10 Hertz, an asynchronous refresh in response to a predetermined input, etc.).

In implementations in which a display inhibited state involves reducing power consumption of a display of a mobile device, rather than inhibiting display of all information, the display can be used to present a user interface in accordance with functions that are available in the display inhibited state. For example, if a hybrid touchscreen display is provided that includes an LCD display and an electronic paper display, the electronic paper display can be used to present a user interface corresponding to features available in the display inhibited state at a low refresh rate.

Any suitable technique(s) can be used to determine whether the mobile device is in a display inhibited state. For example, the remote control application can request a status of the mobile device periodically to determine whether the mobile device is in a display inhibited state. As another example, in response to the mobile device entering a display inhibited state, an operating system of the mobile device can cause a notification to be sent to applications running on the mobile device, such as the remote control application.

If the remote control application determines that the touchscreen is not in a display inhibited state ("NO" at 112), process 100 can return to 108 and can present an appropriate remote control interface (e.g., present the remote control interface of 106 if the mobile device is not at the lock screen, or present the remote control interface of 110 if the mobile device is at the lock screen). Otherwise, if the remote control application determines that the display of the touchscreen is inhibited ("YES" at 112), process 100 can proceed to 114.

Figure 2C:
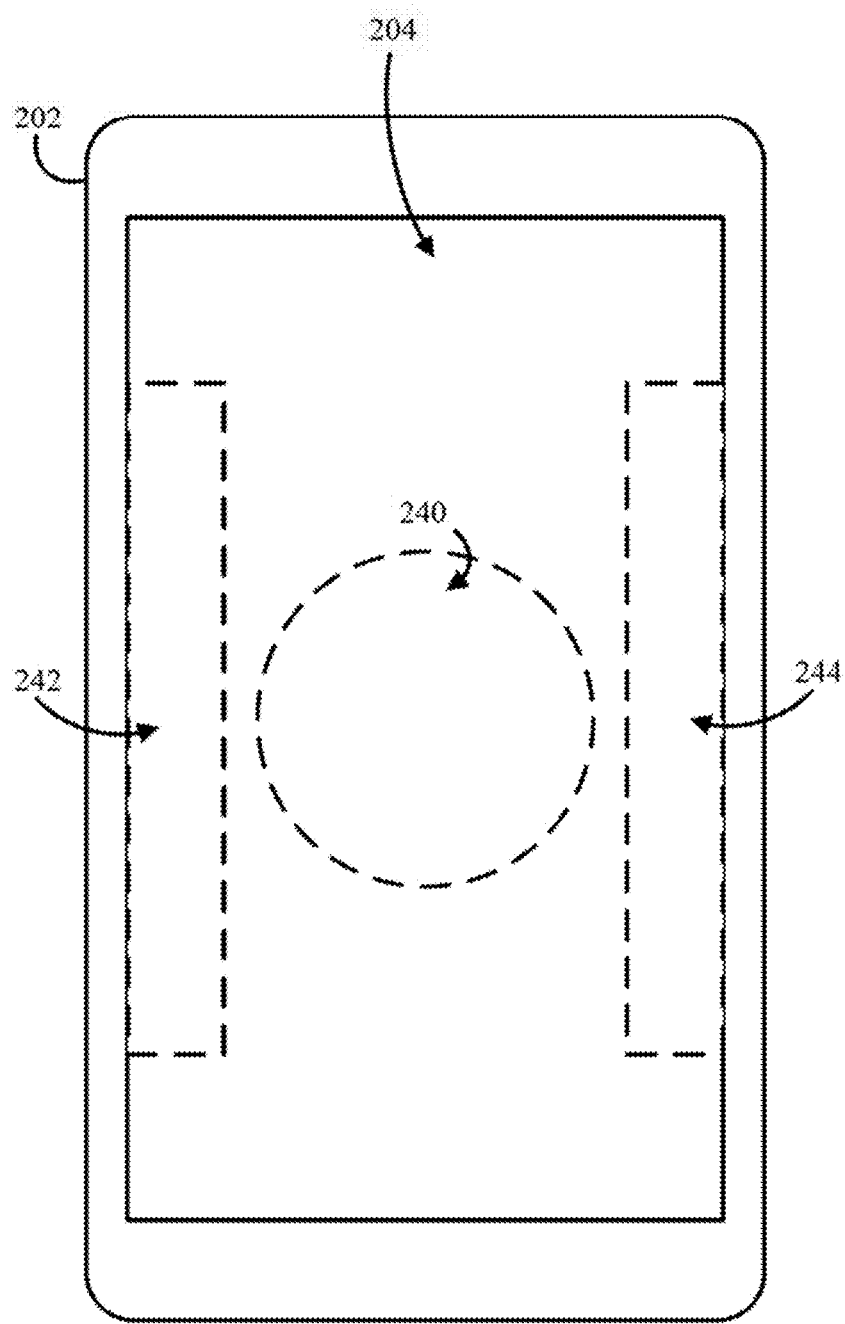

It should be noted that, in some implementations, the remote control application can present the user of the mobile device with one or more intermediary interfaces. This can, for example, transition the user of the mobile device from a remote control interface or any other suitable interface currently displayed on the screen of the mobile device to a touch interface that is provided when the mobile device has entered a display inhibited state. In one suitable implementation, referring back to FIG. 2B, in response to determining that the mobile device is entering a display inhibited state, the remote control application can identify and/or highlight the user interface elements that are available in the display inhibited state. In a more particular example, the remote control application can present an overlay indicating the areas for providing a touch input that correspond to the identified user interface elements. As shown in FIG. 2C, the remote control application can identify areas 240, 242, and 244 prior to entering the display inhibited state. In another more particular example, the remote control application can provide an overlay describing which user interface elements are available in the displayed inhibited state and which user interface elements are not available in the display inhibited state.

In these examples, the remote control application can provide the identified user interface elements, the overlay, and/or any other suitable interface for a predetermined period of time (e.g., three seconds) prior to entering the display inhibited state. Additionally or alternatively, the remote control application can continue to provide the identified user interface elements and/or the overlay prior to entering the display inhibited state until the user of the mobile device provides a suitable indication to suspend its presentation (e.g., in response to the user selecting a "Do not show again" button).

In yet another more particular example, the remote control application can provide one or more animations that transition the user of the mobile device to the display inhibited state. For example, the remote control can use one or more animations to show the change from the user interface elements being displayed on the screen of the mobile device to the user interface elements that are available in the display inhibited state (e.g., from a full set of user interface elements to a subset of user interface elements upon detecting that the mobile device has entered a display inhibited state). Referring to FIGS. 2B and 2C, in response to providing area 240 in the display inhibited state that corresponds to play/pause button 206, the remote control application can use an animation to enlarge play/pause button 206 to indicate area 240 for receiving a touch input. In this example, as there are fewer user interface elements activated in the display inhibited state, the remote control application can provide an area for receiving a touch input corresponding to a user interface element that is larger than the displayed user interface element.

At 114, the remote control application can receive inputs from a touch interface of the touchscreen using a remote control interface layout that corresponds to functions that are available in a display inhibited state of the remote control application. In some implementations, the remote control application can cause the touch interface of the touchscreen to remain active when the mobile device is in a display inhibited state. Additionally, in some implementations, a sensitivity of the touch interface of the touchscreen can be reduced in response to the mobile device entering the display inhibited state. For example, a frequency at which signals from the touch interface are detected can be reduced, a threshold for detection can be increased (e.g., requiring a longer touch, requiring a more firm touch, etc.), functionality of the touch interface can be reduced by, for example, disabling multi-touch capabilities of the touch interface, disabling gesture recognition, or any other suitable actions to reduce the sensitivity of the touch interface.

FIG. 2C shows an illustrative example of a user interface of a remote control application in accordance with some implementations of the disclosed subject matter in which a mobile phone running the remote control is in a display inhibited state. In the example shown in FIG. 2C, the remote control application is running on mobile device 202 and a touch interface of touchscreen 204 is active to receive commands, however a display of touchscreen 204 is inhibited such that mobile device 202 does not present a user interface.

The user interface of FIG. 2C can include areas that correspond to a touch input, such as, a touch input by a user. More particularly, dashed lines in FIG. 2C indicate portions of the touchscreen that, when touched, can cause the mobile device running the remote control application to generate a command. For example, the user interface of FIG. 2C can include an area 240 that can correspond to a play/pause command. Area 242 can correspond to an area for receiving swipe inputs to generate volume control commands, and area 244 can correspond to an area for receiving swipe inputs to generate channel control commands. In some implementations, these areas can generally correspond to the areas shown by user interface elements such as play/pause button 206, volume control 208 and channel control 210, as shown in FIGS. 2A and 2B. Additionally, these areas can be enlarged relative to an area of the corresponding user interface element to facilitate a user using the user interface areas during a display inhibited state in which visual feedback of a location that accepts user input is not shown. For example, an area for accepting touch inputs can be increased by a predetermined percentage (e.g., twenty percent, one third, etc.). As another example, the entire surface of the touchscreen can correspond to a single function (e.g., a touch anywhere on touchscreen 204 can correspond to a play/pause command). Additionally, different touch inputs on the same portion can correspond to different functions. For example, a touch gesture anywhere on the surface can correspond to a play/pause command, and a swipe gesture on a left side of the display can correspond to a volume control, while a swipe gesture on the right side can correspond to a channel control. Any other suitable controls and/or combination of controls can be implemented in a display inhibited state.

Figure 3:
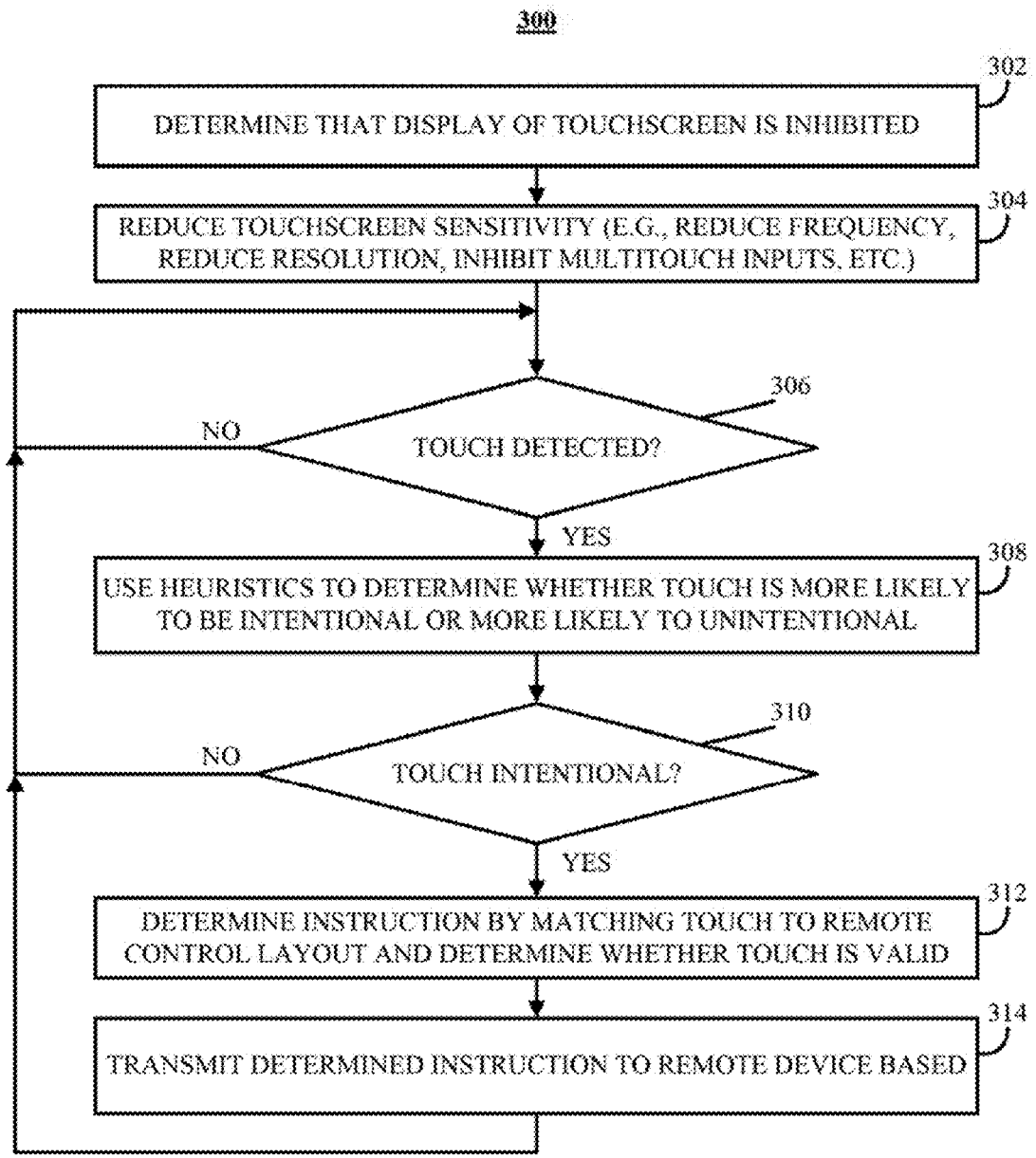
FIG. 3 shows an illustrative example of a process for receiving touch inputs at a touchscreen of a mobile device while display by the touchscreen is inhibited in accordance with some implementations of the disclosed subject matter.

FIG. 3 shows an illustrative example 300 of a process for transmitting instructions to a remote device by receiving inputs for controlling a remote device using a touchscreen, in which a display of the touchscreen is inhibited in accordance with some implementations of the disclosed subject matter. At 302, the remote control application running on the mobile device can determine that the display of the touchscreen is inhibited. As described above in connection with FIG. 1, the determination of whether the display is inhibited can be an active determination or a passive determination. Further, as described above in connection with FIG. 1, the display can be inhibited using any suitable techniques, such as placing the display into a low power state (or other power conservation state), inhibiting the backlight of the display, etc.

At 304, the remote control application can cause the sensitivity of the touch interface of the touchscreen to be reduced. For example, a frequency at which inputs to the touchscreen are detected can be decreased, a touch sensitive resolution of the touchscreen can be reduced, multi-touch sensitivity can be inhibited, gesture recognition can be inhibited (e.g., touch sensing is carried as binary or on/off), or any other suitable technique for reducing power consumption of the touch interface by reducing touch sensitivity. In some implementations, a performance of a processor of the mobile device can reduced by, for example, reducing a driving frequency of the processor, or otherwise putting the processor into a low power state (or other power conservation state).

At 306, the remote control application can receive a signal indicating whether a touch was detected at the touch interface of the touchscreen and/or information related to a touch that was detected (e.g., location, timing, direction, etc.). If a touch is not detected ("NO" at 306), process 300 can return to 306 and continue to receive signals indicating whether a touch was received. Otherwise, if a touch is detected ("YES" at 306), process 300 can proceed to 308.

At 308, the remote control application can use heuristics to determine whether the touch is more likely to be an intentional touch, or more likely to be an unintentional touch. For example, the remote control application can determine whether it is more likely that a user intended to activate the user interface of the remote control application, or it is more likely that the touch was unintentional. Any suitable technique(s) can be used in determining whether a touch was intentional. For example, an accelerometer(s) or gyroscope(s) of the mobile device can be used to determine whether the mobile device is moving or rotating above a certain threshold which may indicate that the user unintentionally touched the user interface (e.g., the user is picking up the mobile device). As another example, inputs that are indicative of transient touches (e.g., touches having a duration of less than a half second) can be ignored to reduce the likelihood of accidental touches triggering a command. As yet another example, a user may be required to perform a double tap prior to performing a touch input to verify that the subsequent touch is intentional. It is understood that the preceding are merely examples, and any suitable heuristics can be used to discern intentional from unintentional touches.

It should be noted that, in some implementations, the operating system of the mobile device can define heuristics to determine whether the touch is more likely to be an intentional touch, or more likely to be an unintentional touch. For example, prior to transmitting a signal indicative of a touch on the touchscreen of the mobile device, the mobile device can use heuristics to determine whether the touch is more likely to be an intentional touch or an unintentional touch. In response, the operating system of the mobile device can transmit the detection of a touch to the remote control application (e.g., all touch detections received by the remote control application are deemed intentional as determined by the operating system of the mobile device).

At 310, the remote control application can determine whether the touch detected at 306 was intentional based on the determination at 308. If the remote control determines that the touch was not intentional ("NO" at 310), process 300 can return to 306 and continue to determine whether a touch is detected. Otherwise, if the touch is determined to be intentional ("YES" at 310), process 300 can proceed to 312.

At 312, the remote control application can determine an instruction to be transmitted by matching the touch detected at 306 to the remote control layout for the display inhibited state. For example, if the touch input corresponds to a user interface area (e.g., areas 240-244 of FIG. 2C), and a gesture of the input corresponds to a recognized gesture for such area (e.g., a tap for area 240, a swipe for areas 242 and 244, etc.), a command can be generated based on a function that corresponds to the area of the input and the gesture (e.g., play/pause for area 240, volume up/down for area 242, etc.). In some implementations, a layout of a remote control interface can change based on a pervious user action. For example, as described above in connection with FIG. 2A, after a pause command is generated, a swipe gesture from left to right can be recognized as an input that causes a fast forward command to be generated.

Additionally, in some implementations, the remote control application can determine whether the touch detected at 306 corresponds to a valid instruction. In some implementations, if a touch is determined to be intentional at 308, the touch may nevertheless not correspond to a valid control. For example, a touch within area 242 may be considered intentional as it may be determined to be the beginning of a swipe motion, but if the user does not perform a swipe gesture, the touch may be considered invalid.

At 314, the remote control application can cause the mobile device to transmit an instruction corresponding to a valid touch determined at 312. Any suitable technique(s) can be used for transmitting an instruction corresponding to a command. For example, in some implementations, as described above in connection with FIG. 1, an instruction can be transmitted using a network, such as a network that uses one of the IEEE 802.11 family of wireless communication standards. As another example, an instruction can be transmitted using an infrared transmitter. As yet another example, an instruction can be transmitted using a wireless network to a hardware device having an infrared transmitter, which can then transmit the instruction with the infrared transmitter.

It should be noted that, in some implementations, the remote control application can cause the mobile device to transmit multiple instructions corresponding to a valid touch. For example, in response to the mobile device being paired with and controlling multiple remote devices, the remote control application can cause the mobile device to transmit an instruction to each remote device. In a more particular example, in response to detecting a valid touch to lower the volume of an Internet radio application that is running on multiple devices (e.g., the mobile device, multiple smart television devices, a digital media receiver, and wireless speakers), the remote control application can cause the mobile device to transmit a suitable instruction to each of the remote devices.

In another suitable implementation, in response to controlling a media playback application that is presenting media content to the user on the mobile device and a media playback application that is also presenting the media content on a television device, the remote control application can transmit instructions to each media playback application. For example, in response to receiving a valid pause indication from the user of the remote control application, the remote control application can transmit an instruction to each media playback application on different devices to pause the presentation of the media content.

After transmitting an instruction at 314, process 300 can return to 306 and continue to determine whether a touch has been detected.

Figure 4A:
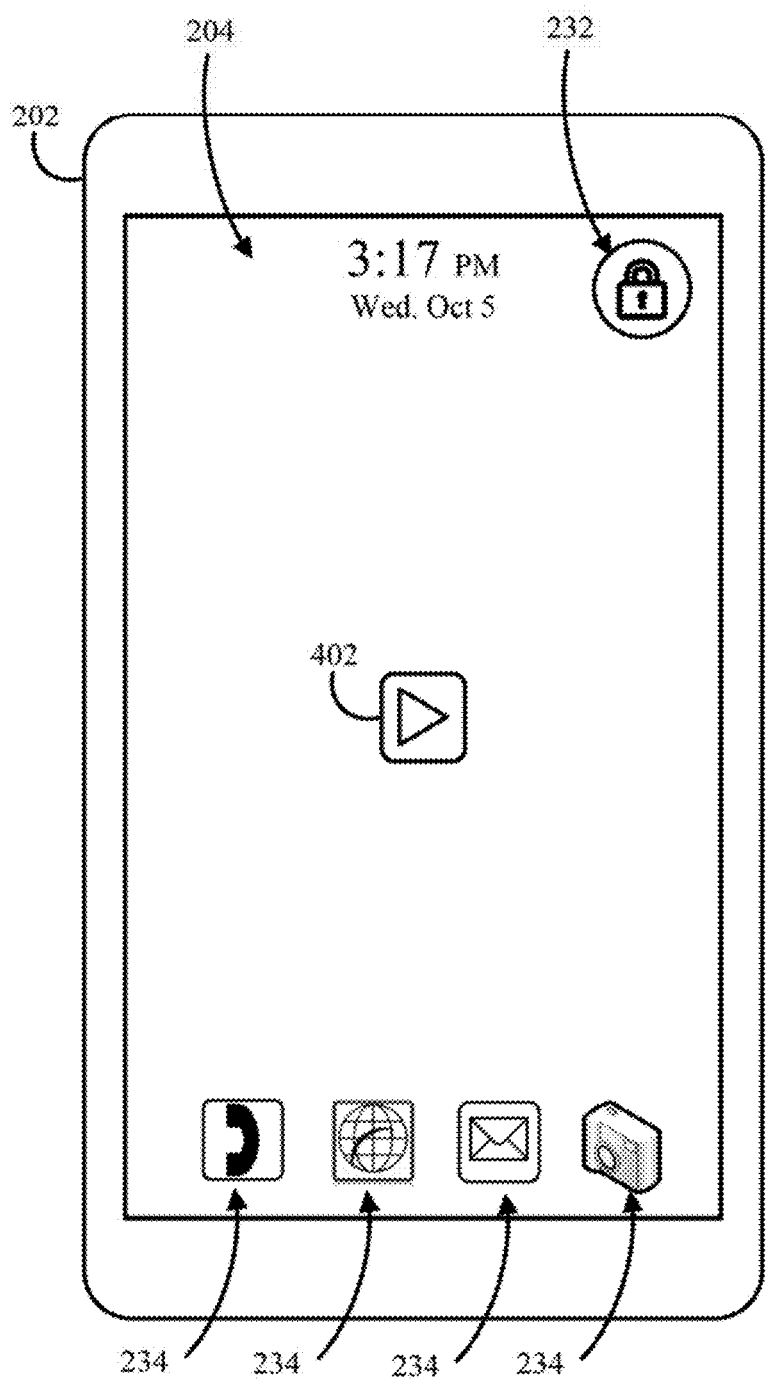
FIGS. 4A and 4B show illustrative examples of user interfaces for initiating a remote control application from a lock screen of a mobile device in accordance with some implementations of the disclosed subject matter.

FIG. 4A shows an illustrative example of a lock screen of mobile device 202 having an icon 402 in accordance with some implementations. In some implementations, if icon 402 is selected, the mobile device can launch the remote control application from the lock screen. In such implementations, launching the remote control application may not be considered a privileged action that would require unlocking the phone. For example, selecting an icon 234 that corresponds to an email application may be a privileged action that requires the user to perform an unlock action or series of actions before granting access to the email application.

In some implementations, icon 402 can be presented only when a remote device is connected that has been paired with the mobile device using the remote control application. In some implementations, selecting icon 402 can cause the remote control interface to be presented in the lock screen of the mobile device, for example, as shown in FIG. 2B. Additionally or alternatively, selecting icon 402 can cause the remote control application to be presented to the user as a foreground application as shown in FIG. 2A, but not grant the user access to privileged functions of the mobile device.

Figure 4B:
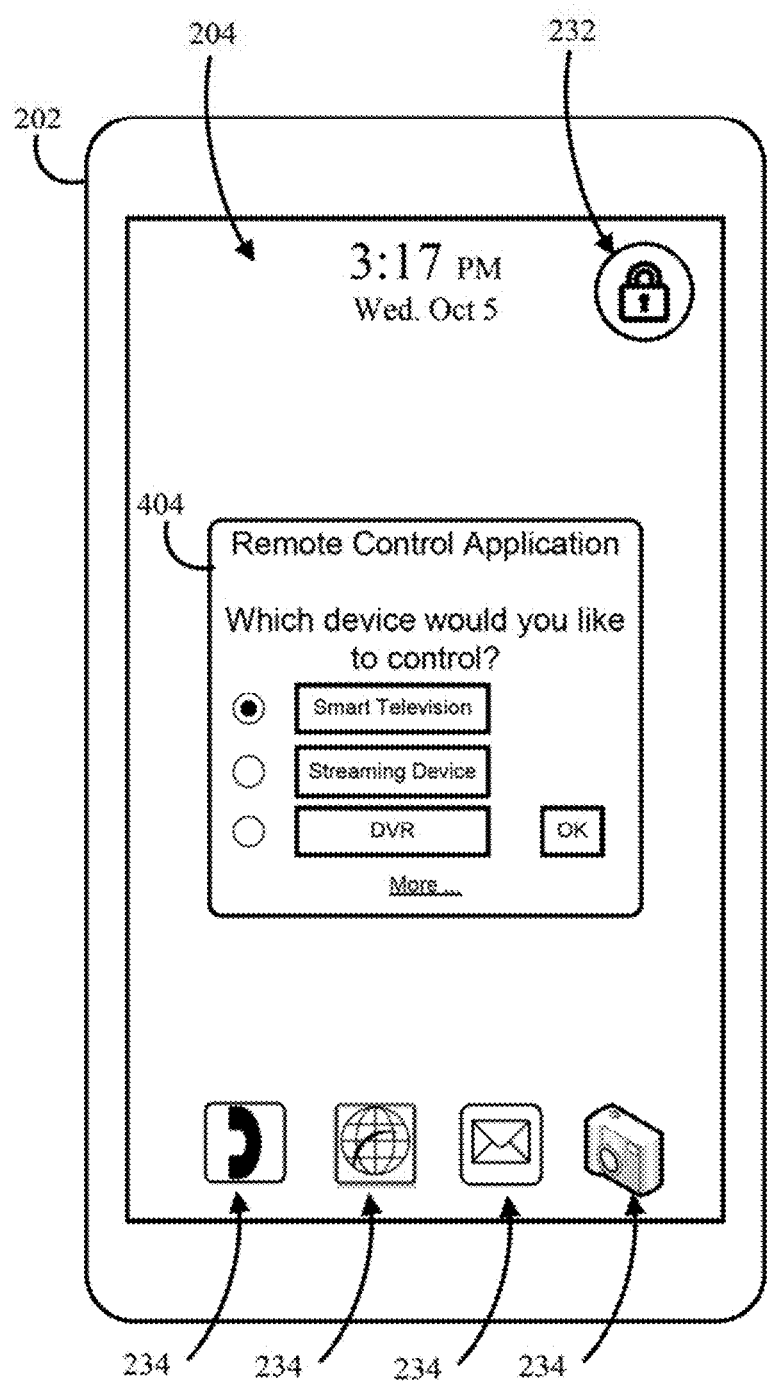

In some implementations, selecting icon 402 can cause the remote control application to present a list 404 of remote devices which can be controlled using the remote control application (e.g., a list of devices discovered at 104), as shown in FIG. 4B. Such a list can be used to query a user as to which remote device the user wishes to control using the remote control application FIG. 4B shows an example of a user interface for selecting a device to be controlled by the remote control application. In some implementations, if multiple devices are detected which can be controlled using the remote control application, or more than one device is associated with a remote device that is detected (e.g., a television coupled to a personal computer, a device connected to a High-Definition Multimedia Interface (HDMI) consumer electronics control (CEC) bus such that the device can issue commands to control other devices connected to the CEC bus, etc.), the user can be presented with the selection interface 404 when the remote application launches from a lock screen of mobile device 202. Additionally, a user can be presented with a similar interface when the remote control application is launched when the mobile device is in an unlocked state.

In some implementations, only remote devices which the mobile device has been paired with while the remote device is in an unlocked state may be presented in selection interface 404. This can inhibit the mobile device from being paired with an unknown device by a malicious user. In some implementations, whether the remote control application is presented in a lock screen as shown in FIG. 2B or in an unlocked state of the mobile device as shown in FIG. 2A, a remote device to be controlled can be changed in response to receiving a suitable input.

In some implementations, if there are more than a predetermined number of remote devices detected, user interface 404 can facilitate scrolling through the devices, or selection of a "more" option can cause additional devices to be presented. In some implementations, names identifying the devices can be populated automatically and/or set by a user when the user initially paired the remote control application with a mobile device, for example, as described above in connection with FIG. 1.

Figure 5:
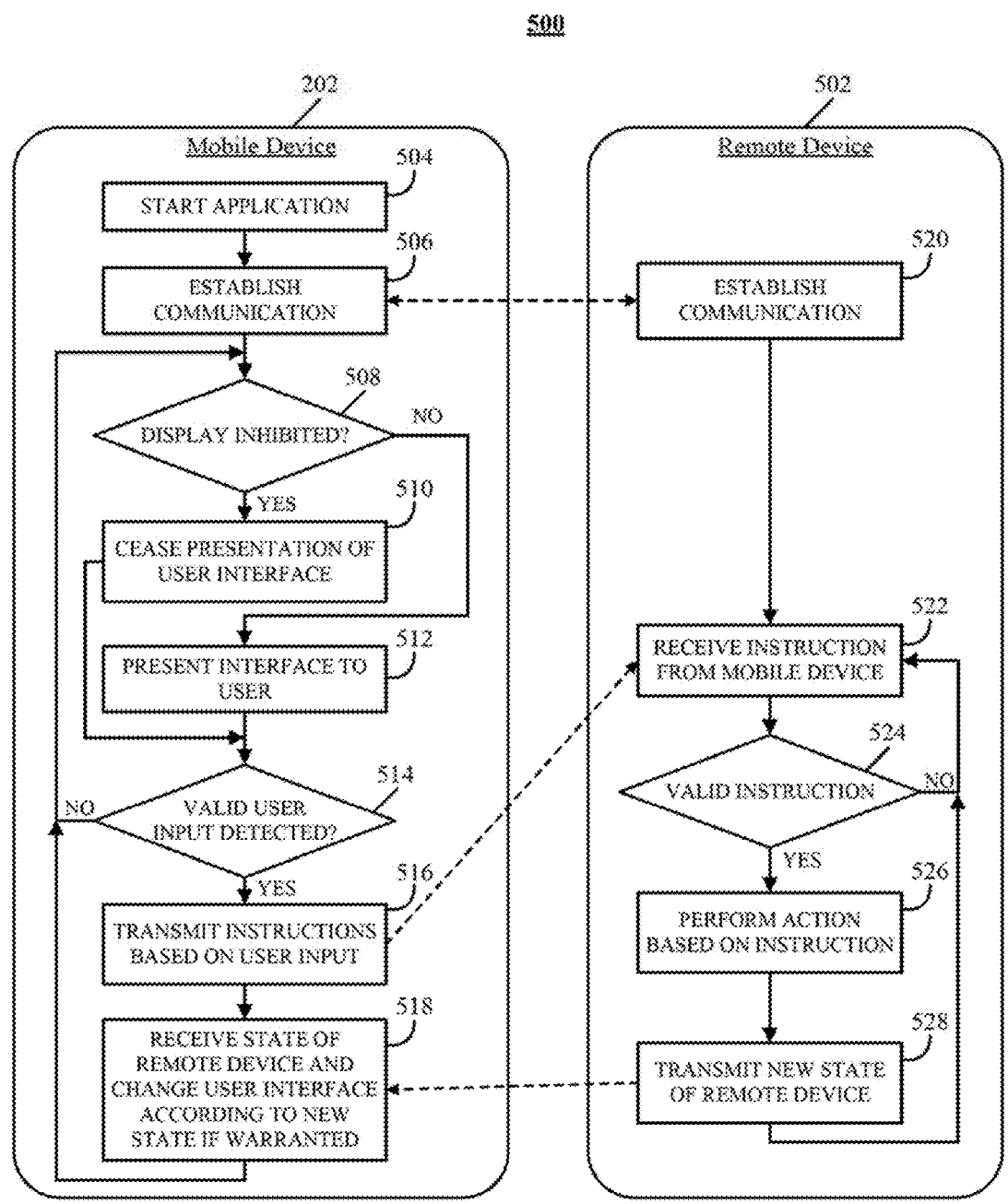
FIG. 5 shows an illustrative example of a process for controlling a remote device using a mobile device in accordance with some implementations of the disclosed subject matter.

FIG. 5 shows an illustrative example 500 of a flow between mobile device 202 running the remote control application and a remote device 502 to be controlled using the remote control application in accordance with some implementations of the disclosed subject matter. In some implementations, remote device 502 can be any suitable device, such as a smart television, a game console, a set-top box, a digital media receiver, a personal computer, a laptop computer, a tablet computer, etc., that is capable of two-way communication with mobile device 202.

At 504, the remote control application can be launched on mobile device 202. As described above, the remote control application can be launched using various techniques, such as by a user selecting the application from a plurality of application. As another example, the remote control application can be launched as part of another application, such as a media playback application, or in response to the user performing an action in another application, such as sharing a video being presented by a video playback application to remote device 502. As yet another example, the remote control application can launch in response to the user selecting the application from a lock screen of mobile device 202, as described above in connection with FIG. 4B. As still another example, the remote control application can launch in response to the presence of a paired remote device being detected. Additionally, the remote control application can launch in response to determining that a remote device that has been detected is in a state to be controlled by the remote control application.

At 506, the remote control application can cause mobile device 202 to establish communication with remote device 502. Such communication can be established using any suitable techniques, such as pairing as described above in connection with FIG. 1.

At 508, the remote control application can determine whether mobile device 202 is in a display inhibited state. For example, the remote control application can determine if mobile device 202 is in a display inhibited state as described above in connection with FIGS. 1 and 3.

If mobile device 202 is determined to be in a display inhibited state ("YES" at 508), flow 500 can proceed to 510 and cease presentation of the remote control user interface. Additionally or alternatively, as described above, depending on the configuration of the display inhibited state, the remote control application can cause the remote control interface to be presented in a limited state, by using, for example, an electronic paper display, etc.

If mobile device 202 is not in a display inhibited state ("NO" at 508), flow 500 can proceed to 512 and continue to present the remote control interface to the user. Such a remote control interface can include any of the interfaces described above, or any other suitable interface. In some implementations, the remote control application can cause the mobile device 202 to transition to a display inhibited state, rather than presenting a remote control interface (whether automatically, or in response to a user input).

At 514, the remote control application can determine whether a valid user input has been detected. For example, inputs can be detected as described above in connection with 314 of FIG. 3.

At 516, the remote control application can cause mobile device 202 to transmit an instruction(s) to remote device 502 based on the user input detected at 514. For example, as described above, transmitting an instruction(s) can be performed using any suitable technique(s).

At 518, the remote control application can receive a signal indicative of a new state of the remote device if a state of the remote device changed in response to the instruction transmitted at 516, and can change the remote control interface if a change in the remote control interface is warranted by the change in state (e.g., as described above in connection with FIG. 1 and/or FIG. 3). For example, if a video being presented by the remote device is paused, the remote control interface can be changed, or the variety of acceptable inputs can changed. In some implementations, changing a remote control interface can include changing a layout that is presented in the remote control user interface, and/or a layout of the remote control user interface when display is inhibited.

At 520, remote device 502 can establish communication with mobile device 202 running the remote control application. In some implementations, communication can be established prior to launching the remote control application, for example, when both mobile device 202 and remote device 502 are on the same network, communication can be established regardless of whether the remote control application is running on mobile device 202. As another example, a presence of the remote device on the network that the mobile device has previously been paired with can be detected. As described above, the remote control application can be launched, for example in the background, when the mobile device is on the same network as a previously paired remote device.

At 522, remote device 502 can receive an instruction(s) from mobile device 202. As described above, the instruction can be received using any suitable technique(s).

At 524, remote device 502 can determine whether the instruction received at 522 is a valid instruction. For example, if a volume control instruction is received at 522, but remote device 502 has no control of a volume level, this can be an example of an invalid instruction. If the instruction received at 522 is invalid ("NO" at 524), flow 500 can return to 522. Otherwise, if the instruction is valid ("YES" at 524), flow 500 can proceed to 526.

At 526, remote device 502 can perform an action based on the valid instruction received at 522. Examples of actions can include play or pause of media (e.g., music, video, etc.) being played by remote device 502, volume control, channel control, placement of a highlighted region, selection of a user interface element, or any other suitable action.

At 528, remote device 502 can transmit a new state of remote device 502 to mobile device 202. As described above, a state of remote device 502 can be used to control the remote control user interface of the remote control application running on mobile device 202. Remote device 502 can return to 522 to continue to receive instructions from mobile device 202.

Figure 6:
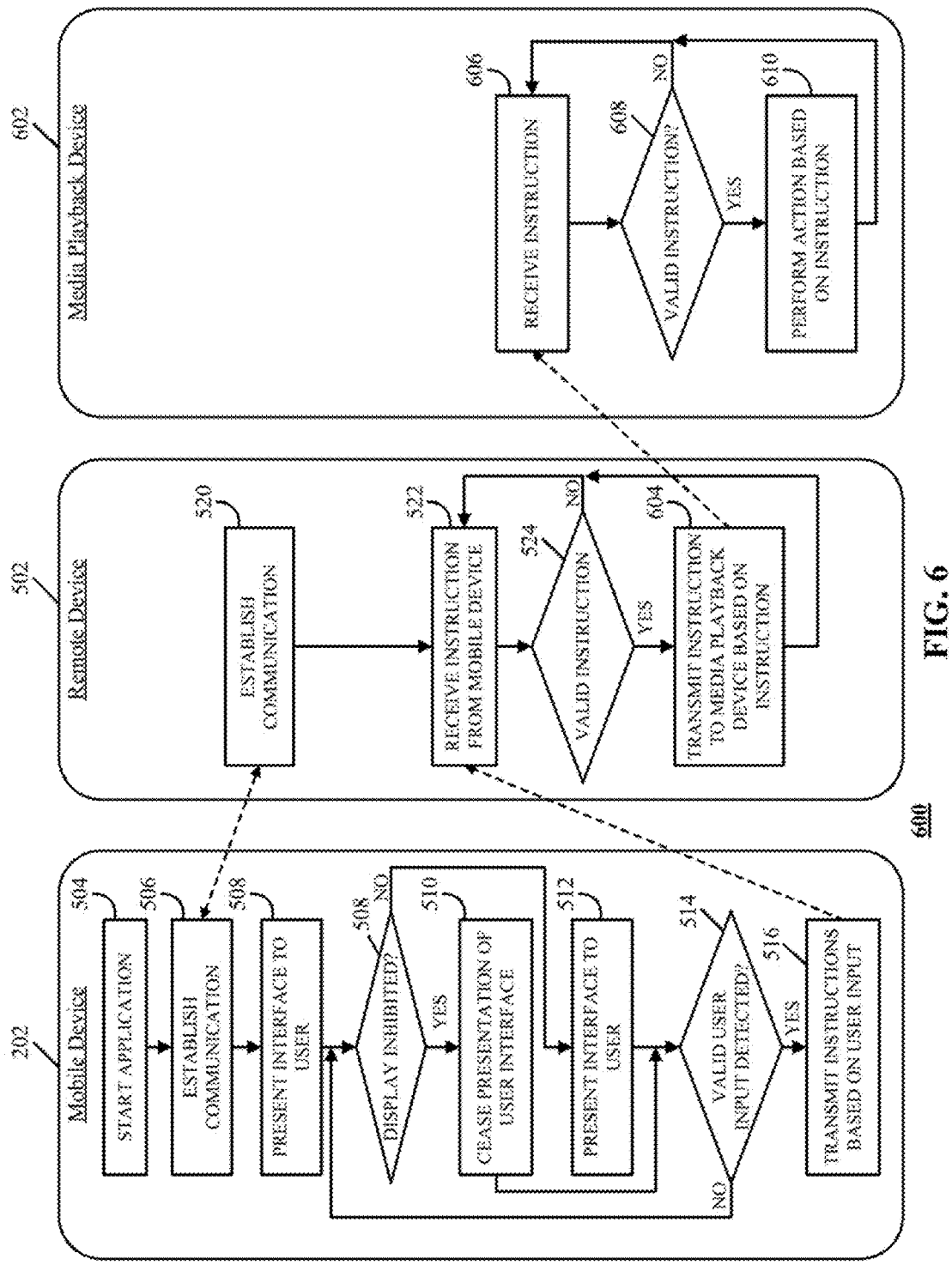
FIG. 6 shows an illustrative example of a process for controlling a media playback device using a mobile device and a remote device in accordance with some implementations of the disclosed subject matter.

FIG. 6 shows an example 600 of a flow among mobile device 202, remote device 502 and a media playback device 602. Media playback device 602 can be any suitable media playback device such as a television, a smart television, a game console, a set-top box, a digital media receiver, a personal computer, a laptop computer, a tablet computer, or any other device that can be controlled by remote device 502. For example, remote device 502 can be a digital media receiver and media playback device 602 can be a television. In such an example, remote device 502 can be used to transmit instructions to media playback device 602 in a format accepted by media playback device 602. In some implementations, communication between remote device 502 and media playback device 602 can be, for example, one way communication by remote device 502 to media playback device 602. For example, remote device 502 can include an infrared transmitter that can be used to send instructions encoded in an infrared signal to an infrared receiver of media playback device 602. Additionally or alternatively, communication between remote device 502 and media playback device 602 can be, for example, two-way communication between remote device 502 and media playback device 602. For example, remote device 502 and media playback device 602 can be connected using the High-Definition Multimedia Interface (HDMI) standard, and can communicate using Consumer Electronic Control (CEC) feature of the HDMI standard.

Flow 600 of FIG. 6 can proceed similarly to flow 500 as described above in connection with FIG. 5 from 504-516 and 520-524. However, after determining that the instruction received at 522 is valid, at 604, remote device 502 can transmit an instruction to media playback device 602, rather than (or in addition to) performing an action. For example, if remote device 502 is not configured to alter a playback volume, an instruction from mobile device 202 to change a volume can be transmitted to media playback device 602.

At 606, media playback device 602 can receive an instruction using any suitable technique(s). In cases where there is one-way communication between remote device 502 and media playback device 602, media playback device 602 can respond to an instruction that is a valid instruction received from any source (e.g., media playback device 602 may not distinguish one source of instructions from another source of instructions).

At 608, media playback device can determine whether the instruction received at 606 is a valid instruction. For example, a set of valid instructions can be based on a state of media playback device 602. More particularly, if an instruction to change a channel is received by media playback device 602 when an input of media playback device 602 is set to an input other than antenna, this may be considered an invalid instruction.

If the instruction received at 608 is invalid ("NO" at 608), flow 600 can return to 606 and media playback device 602 can return to 606, and can continue to receive instructions. Otherwise, if the instruction received at 606 is valid ("YES" at 608), flow 600 can proceed to 610.

At 610, media playback device 602 can perform an action based on the instruction received at 606. Any suitable action(s) can be performed based on the instructions received at 606, such as volume control, channel control, selection of a user interface element(s), changing a setting, etc. After performing the action at 610, flow 600 can return to 606 and continue to receive instructions.

Figure 7:
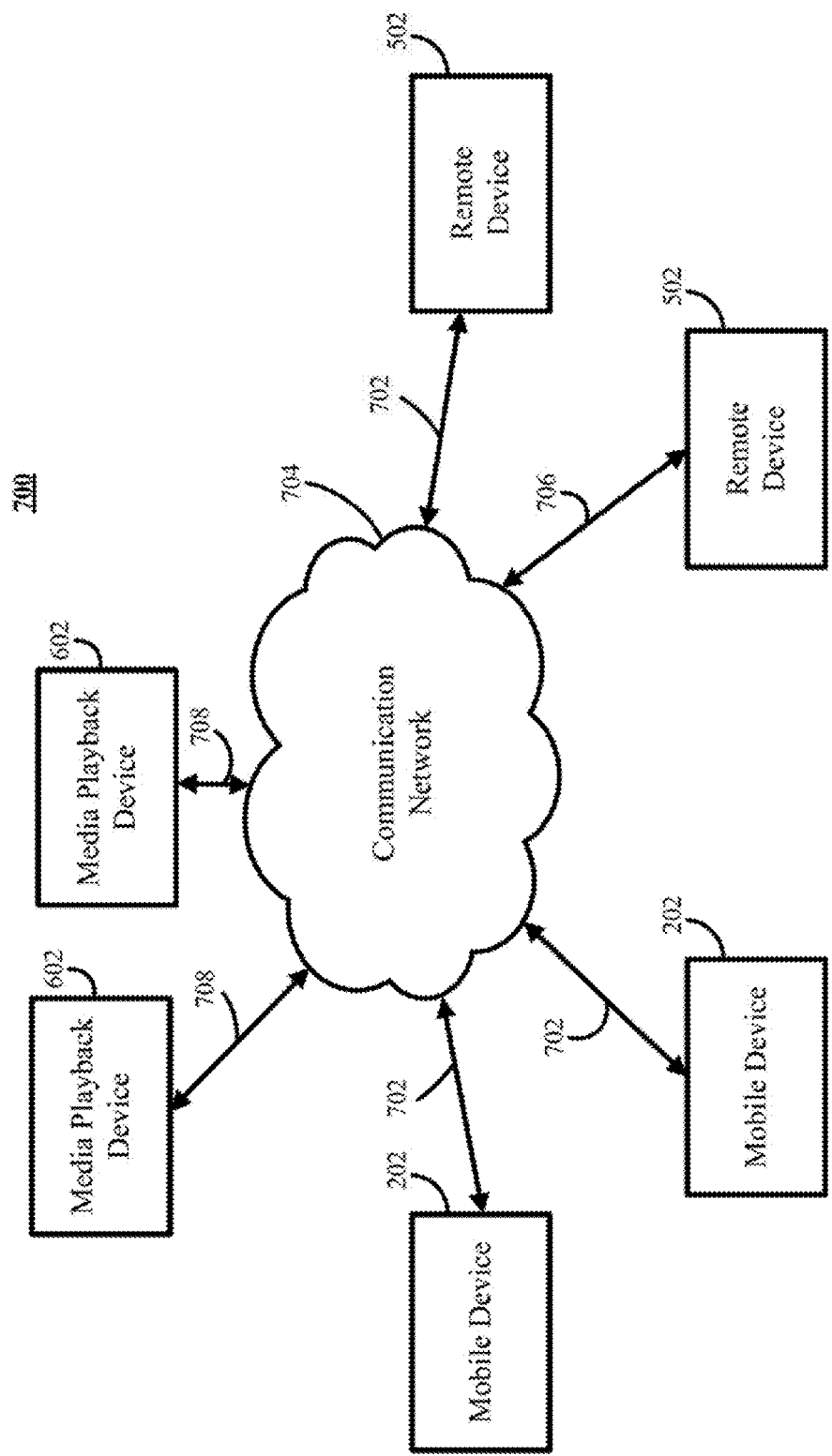
FIG. 7 shows a schematic diagram of an illustrative system suitable for implementation of the mechanisms described herein for controlling a remote device using a touchscreen of a mobile device in a display inhibited state in accordance with some implementations of the disclosed subject matter.

FIG. 7 shows an example 700 of a generalized schematic diagram of a system on which the mechanisms for controlling a remote device using a touchscreen of a mobile device in a display inhibited state as described herein can be implemented in accordance with some implementations. As illustrated, system 700 can include one or more mobile devices 202. Mobile devices 202 can be local to each other or remote from each other. Mobile device 202 can be connected by one or more communications links 702 to a communications network 704 that can be linked via a communications link 706 to one or more remote devices 502, and mobile device 202 and/or remote device 502 can be linked via a communication link 908 to a media playback device 602.

In some implementations, each of mobile devices 202, remote devices 502, and media playback devices 602 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, mobile device 202 can be implemented as a smartphone, a tablet computer, a wearable computer, a personal computer, a laptop computer, a gaming console, a digital media receiver, a set-top box, a smart television, a server, etc.

Communications network 904 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 902, 906, and 908 can be any communications links suitable for communicating data among mobile devices 202, remote devices 502, and media playback devices 602, such as network links, dial-up links, wireless links, hard-wired links, optical links, infrared links, any other suitable communications links, or any suitable combination of such links.

System 700 can include one or more remote devices 502 for presenting media content, presenting media using media playback device 602, controlling operation of media playback device 602 (e.g., using one-way communication), receiving content over communication network 704, performing any other suitable functions, or any suitable combination thereof.

Figure 8:
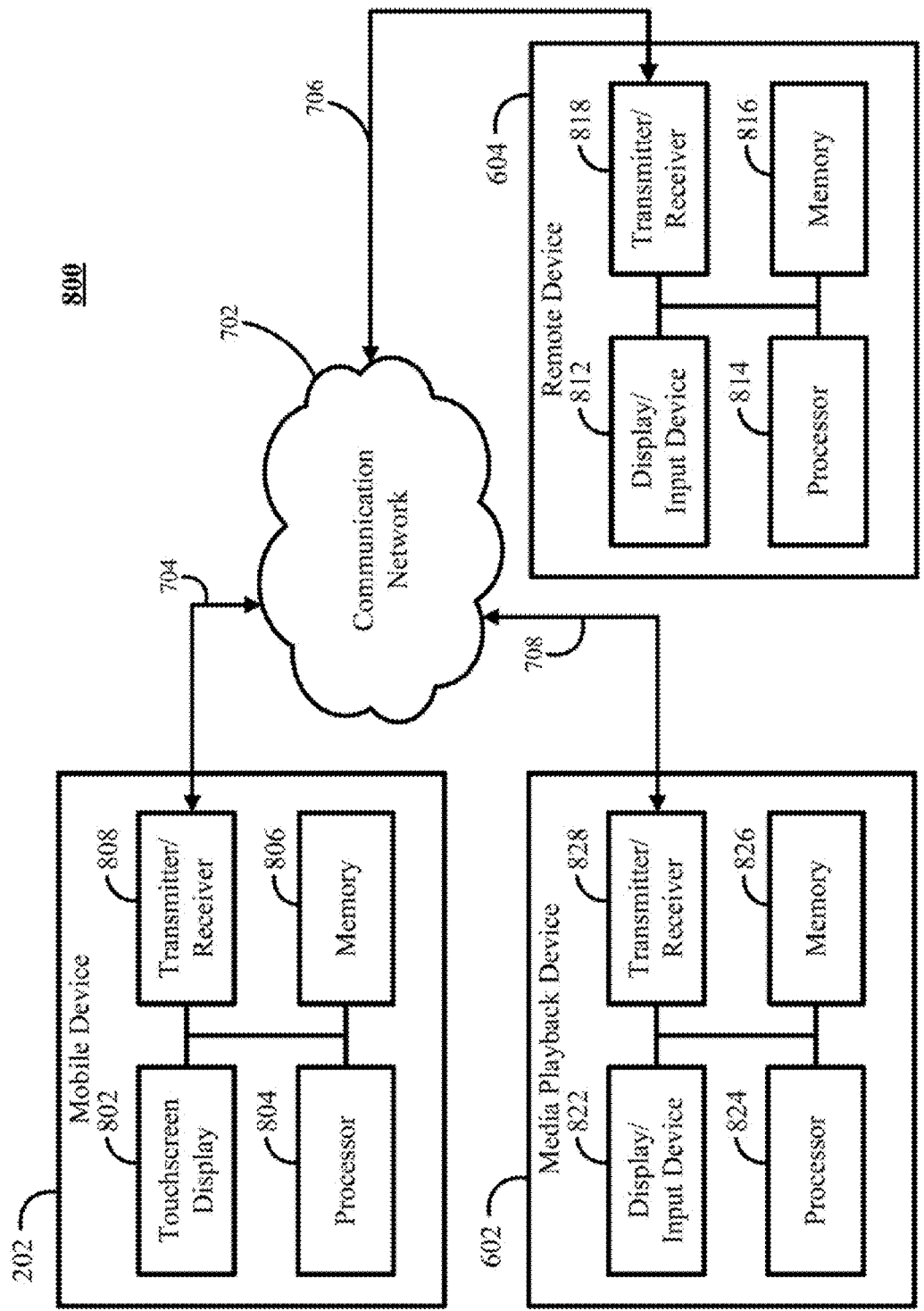
FIG. 8 shows a detailed example of a mobile device, a remote device, and a media playback device of FIG. 7 that can be used in accordance with some implementations of the disclosed subject matter.

FIG. 8 illustrates an example 800 of hardware that can be used to implement one of mobile devices 202, remote devices 502, and media playback devices 602 depicted in FIG. 7 in accordance with some implementations of the disclosed subject matter. Referring to FIG. 8, mobile device 202 can include a hardware processor 802, a display/input device 804, memory 806, and a transmitter/receiver 808, which can be interconnected. In some implementations, memory 806 can include a storage device (such as a non-transitory computer-readable medium) for storing a computer program for controlling hardware processor 802.

Hardware processor 802 can use the computer program to present on display/input device 804 a remote control interface that allows a user to, among other things, control a remote device 502 and/or a media playback device 602. It should also be noted that data received through communications link 702 or any other communications links can be received from any suitable source. In some implementations, hardware processor 802 can send and receive data through communications link 702 or any other communication links using, for example, a transmitter, receiver, transmitter/receiver, transceiver, or any other suitable communication device, such as transmitter/receiver 808. Display/input device 804 can include a touchscreen, a speaker(s), and/or any other suitable display and/or presentation devices such as a, and can further include a computer keyboard, a computer mouse, a microphone, a touchpad, a voice recognition circuit, a touch interface of a touchscreen, and/or any other suitable input device. In some implementations, the touchscreen can include any suitable touch sensing hardware, such as capacitive touch sensors, resistive touch sensors, etc. Additionally, a display of the touchscreen can include any suitable display hardware, such as an LCD display, an electronic paper display, a hybrid LCD/electronic paper display, and/or any other suitable transmissive or reflective display technique(s) can be used in the touchscreen display. Transmitter/receiver 808 can include any suitable transmitter and/or receiver for transmitting and/or receiving, among other things, commands to and status information from a remote device, such as remote device 502.

Remote device 502 can include a hardware processor 812, a display/input device 814, memory 816, and a transmitter/receiver 818, which can be interconnected. In some implementations, memory 816 can include a storage device (such as a non-transitory computer-readable medium) for storing a computer program for controlling hardware processor 812.

Hardware processor 812 can use the computer program to provide media content and/or a user interface to display/input device 814 for presenting the media content and/or user interface on a media playback device. It should also be noted that data received through communications link 706 or any other communications links can be received from any suitable source. In some implementations, hardware processor 812 can send and receive data through communications link 706 or any other communication links using, for example, a transmitter, receiver, transmitter/receiver, transceiver, or any other suitable communication device, such as transmitter/receiver 818. Display/input device 814 can include a flat panel display, a projector, a cathode ray tube display, a video output port, a touchscreen, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 818 can include any suitable transmitter and/or receiver for transmitting and/or receiving, among other things, commands from mobile device 202, status information to mobile device 202, and commands to media playback device 602.

Media playback device 602 can include a hardware processor 822, a display/input device 824, memory 826, and a transmitter/receiver 828, which can be interconnected. In some implementations, memory 826 can include a storage device for storing data received through communications link 708 or through other links. The storage device (such as a non-transitory computer-readable medium) can further include a program for controlling hardware processor 822.

Hardware processor 822 can use the program to receive commands from mobile device 202 and/or remote device 502, as well as present media content, or the like. It should also be noted that data received through communications link 708 or any other communications links can be received from any suitable source. In some implementations, hardware processor 822 can send and receive data through communications link 708 or any other communication links using, for example, a transmitter, receiver, transmitter/receiver, transceiver, or any other suitable communication device, such as transmitter/receiver 828. In some implementations, hardware processor 822 can receive commands and/or values transmitted by one or more users. Display/input device 824 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 808 can include any suitable transmitter and/or receiver for transmitting and/or receiving, among other things, media content including audio and/or video content, and commands from mobile device 202 and/or remote device 502.

In one particular implementation, the mechanisms described herein including the remote control application can include client-side software, client-side hardware, server-side software, server-side hardware, or any suitable combination thereof. For example, the remote control application can encompass a computer program written in a programming language recognizable by hardware processor 802 (e.g., a program written in a programming language, such as, Java, C, Objective-C, C++, C#, Javascript, Visual Basic, or any other suitable approaches). As another example, the remote control application can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1, 3, 5 and 6 can be executed or performed in any order or sequence not limited to the order and sequence shown and described in the figures. Also, some of the above steps of the processes of FIGS. 1, 3, 5 and 6 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

Accordingly, methods, systems, and media for controlling a remote device using a touchscreen of a mobile device in a display inhibited state are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for controlling media playback devices, the method comprising:

detecting a media playback device to be controlled;

presenting, using a touch-sensitive display of a mobile device, a remote control interface having a plurality of user interface elements that correspond to actions of the selected media playback device, wherein each of the one or more interface elements is selectable upon receiving a predetermined user input from the touch-sensitive display that corresponds to the particular user interface element;

presenting, using the touch-sensitive display, a lock screen that includes at least a first subset of user interface elements of the plurality of user interface elements that are enabled during a display inhibited state in which presentation of the plurality of user interface elements is inhibited and a second subset of user interface elements of the plurality of user interface element that are disabled during the display inhibited state, wherein the second subset of user interface elements are presented with an indication that the second subset of user interface elements will be disabled during the display inhibited state;

receiving an input from a first area of the touch-sensitive display during presentation of the lock screen;

determining, during presentation of the lock screen, that the first area of the touch-sensitive display corresponds to the area of the touch-sensitive display presenting a first user interface element of the plurality of user interface elements;

selecting, during presentation of the lock screen, a first action of the selected media playback device to be performed that corresponds to the first user interface element;

transmitting, during presentation of the lock screen, a first instruction to perform the selected first action to the media playback device;
determining that the touch-sensitive display has entered the display inhibited state;
receiving an input from a second area of the touch-sensitive display in the display inhibited state;
determining, while the touch-sensitive display is in the display inhibited state, that the second area of the touch-sensitive display corresponds to the area of the touch-sensitive display used to present a second user interface element of the first subset of user interface elements;
selecting, while the touch-sensitive display is in the display inhibited state, a second action of the media playback device to be performed that corresponds to the second user interface element; and
transmitting, while the touch-sensitive display is in the display inhibited state, an instruction to perform the selected second action to the media playback device.

2. The method of claim 1, wherein detecting a media playback device to be controlled further comprises receiving a selection of the media playback device from a plurality of media playback devices.

3. The method of claim 1, wherein the indication that the second subset of user interface elements will be disabled during the display inhibited state comprises the second subset of user interface elements being presented in a different color than the first subset of user interface elements.

4. The method of claim 1, wherein the remote control interface is presented in response to determining that the touch-sensitive display of the mobile device is entering the display inhibited state.

5. The method of claim 1, wherein the indication that the second subset of user interface elements will be disabled during the display inhibited state comprises a user interface overlay with an explanation indicating that the second subset of user interface elements will be disabled in the display inhibited state.

6. The method of claim 1, wherein the plurality of user interface elements includes a pause button.

7. The method of claim 6, wherein the second action to be performed includes pausing presentation of a media content item being presented by the media playback device upon determining that the received input in the display inhibited state corresponds to a location of the pause button.

8. The method of claim 1, wherein the display inhibited state is entered after a predetermined period of time without receiving user input.

9. The method of claim 1, wherein entering the display inhibited state comprises inhibiting a backlight of the touch-sensitive display.

10. The method of claim 1, wherein entering the display inhibited state comprises entering a power conservation state.

11. A system for controlling media playback devices, the system comprising:
a touch-sensitive display of a mobile device; and
a hardware processor that is configured to:
  detect a media playback device to be controlled;
  present, using the touch-sensitive display, a remote control interface having a plurality of user interface elements that correspond to actions of the selected media playback device, wherein each of the one or more interface elements is selectable upon receiving a predetermined user input from the touch-sensitive display that corresponds to the particular user interface element;
  present, using the touch-sensitive display, a lock screen that includes at least a first subset of user interface elements of the plurality of user interface elements that are enabled during a display inhibited state in which presentation of the plurality of user interface elements is inhibited and a second subset of user interface elements of the plurality of user interface element that are disabled during the display inhibited state, wherein the second subset of user interface elements are presented with an indication that the second subset of user interface elements will be disabled during the display inhibited state;
  receive an input from a first area of the touch-sensitive display during presentation of the lock screen;
  determine, during presentation of the lock screen, that the first area of the touch-sensitive display corresponds to the area of the touch-sensitive display presenting a first user interface element of the plurality of user interface elements;
  select, during presentation of the lock screen, a first action of the selected media playback device to be performed that corresponds to the first user interface element;
  transmit, during presentation of the lock screen, a first instruction to perform the selected first action to the media playback device;
  determine that the touch-sensitive display has entered the display inhibited state;
  receive an input from a second area of the touch-sensitive display in the display inhibited state;
  determine, while the touch-sensitive display is in the display inhibited state, that the second area of the touch-sensitive display corresponds to the area of the touch-sensitive display used to present a second user interface element of the first subset of user interface elements;
  select, while the touch-sensitive display is in the display inhibited state, a second action of the media playback device to be performed that corresponds to the second user interface element; and
  transmit, while the touch-sensitive display is in the display inhibited state, an instruction to perform the selected second action to the media playback device.

12. The system of claim 11, wherein the hardware processor is further configured to receive a selection of the media playback device from a plurality of media playback devices.

13. The system of claim 11, wherein the indication that the second subset of user interface elements will be disabled during the display inhibited state comprises the second subset of user interface elements being presented in a different color than the first subset of user interface elements.

14. The system of claim 11, wherein the remote control interface is presented in response to determining that the touch-sensitive display of the mobile device is entering the display inhibited state.

15. The system of claim 11, wherein the indication that the second subset of user interface elements will be disabled during the display inhibited state comprises a user interface overlay with an explanation indicating that the second subset of user interface elements will be disabled in the display inhibited state.

16. The system of claim 11, wherein the plurality of user interface elements includes a pause button.

17. The system of claim 16, wherein the second action to be performed includes pausing presentation of a media content item being presented by the media playback device upon determining that the received input in the display inhibited state corresponds to a location of the pause button.

18. The system of claim 11, wherein the display inhibited state is entered after a predetermined period of time without receiving user input.

19. The system of claim 11, wherein entering the display inhibited state comprises inhibiting a backlight of the touch-sensitive display.

20. The system of claim 11, wherein entering the display inhibited state comprises entering a power conservation state.

21. A non-transitory computer-readable medium containing computer executable instructions that, when executed by a processor, cause the processor to perform a method for controlling media playback devices, the method comprising:
  detecting a media playback device to be controlled;
  presenting, using a touch-sensitive display of a mobile device, a remote control interface having a plurality of user interface elements that correspond to actions of the selected media playback device, wherein each of the one or more interface elements is selectable upon receiving a predetermined user input from the touch-sensitive display that corresponds to the particular user interface element;
  presenting, using the touch-sensitive display, a lock screen that includes at least a first subset of user interface elements of the plurality of user interface elements that are enabled during a display inhibited state in which presentation of the plurality of user interface elements is inhibited and a second subset of user interface elements of the plurality of user interface element that are disabled during the display inhibited state, wherein the second subset of the plurality of user interface elements are presented with an indication that the second subset of user interface elements will be disabled during the display inhibited state;
  receiving an input from a first area of the touch-sensitive display during presentation of the lock screen;
  determining, during presentation of the lock screen, that the first area of the touch-sensitive display corresponds to the area of the touch-sensitive display presenting a first user interface element of the plurality of user interface elements;
  selecting, during presentation of the lock screen, a first action of the selected media playback device to be performed that corresponds to the first user interface element;
  transmitting, during presentation of the lock screen, a first instruction to perform the selected first action to the media playback device;
  determining that the touch-sensitive display has entered the display inhibited state;
  receiving an input from a second area of the touch-sensitive display in the display inhibited state;
  determining, while the touch-sensitive display is in the display inhibited state, that the first area of the touch-sensitive display corresponds to the area of the touch-sensitive display used to present a second user interface element of the first subset of user interface elements;
  selecting, while the touch-sensitive display is in the display inhibited state, an action of the media playback device to be performed that corresponds to the second user interface element;
  transmitting, while the touch-sensitive display is in the display inhibited state, an instruction to perform the selected second action to the media playback device.

22. The non-transitory computer-readable medium of claim 21, wherein detecting a media playback device to be controlled further comprises receiving a selection of the media playback device from a plurality of media playback devices.

23. The non-transitory computer-readable medium of claim 21, wherein the indication that the second subset of user interface elements will be disabled during the display inhibited state comprises the second subset of user interface elements being presented in a different color than the first subset of user interface elements.

24. The non-transitory computer-readable medium of claim 21, wherein the remote control interface is presented in response to determining that the touch-sensitive display of the mobile device is entering the display inhibited state.

25. The non-transitory computer-readable medium of claim 21, wherein the indication that the second subset of user interface elements will be disabled during the display inhibited state comprises a user interface overlay with an explanation indicating that the second subset of user interface elements will be disabled in the display inhibited state.

26. The non-transitory computer-readable medium of claim 21, wherein the plurality of user interface elements includes a pause button.

27. The non-transitory computer-readable medium of claim 26, wherein the second action to be performed includes pausing presentation of a media content item being presented by the media playback device upon determining that the received input in the display inhibited state corresponds to a location of the pause button.

28. The non-transitory computer-readable medium of claim 21, wherein the display inhibited state is entered after a predetermined period of time without receiving user input.

29. The non-transitory computer-readable medium of claim 21, wherein entering the display inhibited state comprises inhibiting a backlight of the touch-sensitive display.

30. The non-transitory computer-readable medium of claim 21, wherein entering the display inhibited state comprises entering a power conservation state.

* * * * *